(12) United States Patent
Nielsen

(10) Patent No.: US 9,706,400 B2
(45) Date of Patent: Jul. 11, 2017

(54) USER AUTHENTICATION BASED ON RESHUFFLING DISPLAYED IMAGES PROVIDED ON A USER DEVICE

(71) Applicant: SONY CORPORATION, Tokyo (JP)

(72) Inventor: Frank Nielsen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 14/228,539

(22) Filed: Mar. 28, 2014

(65) Prior Publication Data
US 2014/0315519 A1    Oct. 23, 2014

(30) Foreign Application Priority Data

Apr. 19, 2013   (JP) .................................. 2013-088729

(51) Int. Cl.
*H04W 12/06*   (2009.01)
*H04W 12/00*   (2009.01)
(Continued)

(52) U.S. Cl.
CPC ............ *H04W 12/06* (2013.01); *G06F 21/36* (2013.01); *H04L 63/0846* (2013.01); *H04L 63/1475* (2013.01)

(58) Field of Classification Search
CPC ..... H04W 12/06; H04W 12/00; H04W 12/02; H04W 12/08; H04W 12/10; H04L 9/006; H04L 9/0813; H04L 9/0844; H04L 9/32; H04L 63/1475; H04L 63/0846; G06F 21/36; G06F 21/30; G06F 21/31; G06F 21/44; G06F 21/00

See application file for complete search history.

(56) References Cited

U.S. PATENT DOCUMENTS 8,384,744 B2 *   2/2013   Nashida ............. G06F 3/04883
                                                                                    345/642
8,577,807 B2 *  11/2013   Kokumai et al. ............... 705/50
(Continued)

OTHER PUBLICATIONS

Keita Watanabe et al., CursorCamouflage: Multiple Dummy Cursors as a Defense against Shoulder Suiting, SIGGRAPH Asia 2012, Emergine Technolgy, Nov. 2012.

*Primary Examiner* — Meless Zewdu
(74) *Attorney, Agent, or Firm* — Chip Law Group

(57) ABSTRACT

There is provided an information processing apparatus including an operation detection unit configured to detect an operation of a user, a display control unit configured to move and display first information formed by first components different from each other according to a movement operation of the user detected by the operation detection unit and to fix and display second information formed by second components different from each other, and an information acquisition unit configured to acquire, based on the selection operation, information regarding the second components displayed at positions corresponding to the first components based on a selection operation of the user detected by the operation detection unit. The information regarding the second components acquired by the information acquisition unit based on the selection operation performed at least once and information regarding the first components corresponding to the information regarding the second components are used to authenticate the user.

15 Claims, 27 Drawing Sheets

(51) Int. Cl.
 *G06F 21/36* (2013.01)
 *H04L 29/06* (2006.01)

(56) References Cited

U.S. PATENT DOCUMENTS

| | | | |
|---|---|---|---|
| 2008/0244700 A1* | 10/2008 | Osborn et al. ................. 726/2 |
| 2010/0017875 A1* | 1/2010 | Hirakawa ..................... 726/19 |
| 2010/0043062 A1* | 2/2010 | Alexander et al. ............ 726/6 |
| 2010/0117792 A1* | 5/2010 | Faith .................... G06Q 20/40 340/5.81 |
| 2011/0321125 A1* | 12/2011 | Kyohgoku ............ G06F 21/00 726/2 |
| 2012/0159592 A1* | 6/2012 | Griffin et al. ................. 726/7 |
| 2012/0249295 A1* | 10/2012 | Yeung ................ G06F 3/04883 340/5.54 |
| 2012/0272311 A1* | 10/2012 | Althammer ........... G06F 21/36 726/16 |
| 2012/0291108 A1* | 11/2012 | Talamo ................ H04L 9/3273 726/6 |

* cited by examiner

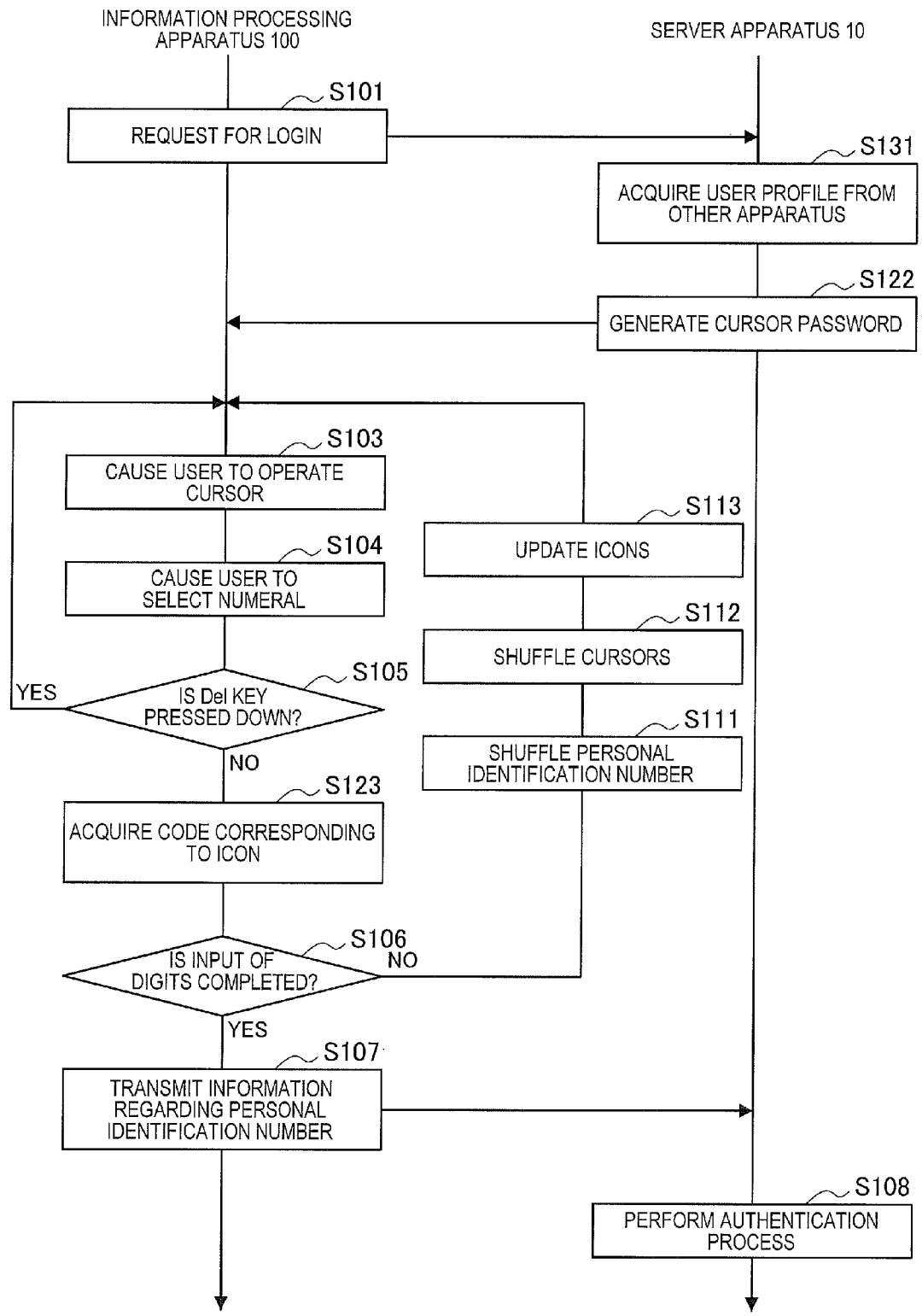

USER AUTHENTICATION BASED ON RESHUFFLING DISPLAYED IMAGES PROVIDED ON A USER DEVICE

CROSS REFERENCE TO RELATED APPLICATIONS

This application claims the benefit of Japanese Priority Patent Application JP 2013-088729 filed Apr. 19, 2013, the entire contents of which are incorporated herein by reference.

BACKGROUND

The present disclosure relates to an information processing apparatus, an information processing method, and a computer program.

When users withdraw savings in automated teller machines (ATMs) or pay for goods using credit cards in shops, the users are normally asked to input, for example, 4-digit personal identification numbers. However, when personal identification numbers are input in public places, there is typically a risk of the personal identification numbers being viewed by others.

Also, in so-called Internet banking services or online shopping services using the Internet, users are sometimes asked to input personal identification numbers. There is a risk of other malicious persons becoming aware of the personal identification numbers in these cases as well, for example, when trajectories of mouse cursors are tracked by the malicious persons.

Accordingly, a technology for reducing a risk of a personal identification number being revealed due to the trajectory of a mouse cursor is disclosed in, for example, CursorCamouflage: Multiple Dummy Cursors as A Defense against Shoulder Surfing (http://www.designinterface.jp/publications/001/CursorCamo_2012asia.pdf). The technology for displaying a plurality of dummy mouse cursors in addition to a genuine mouse cursor to prevent a personal identification number from being revealed to others due to the trajectory of the mouse cursor is disclosed in Cursor-Camouflage: Multiple Dummy Cursors as A Defense against Shoulder Surfing (http://www.designinterface.jp/publications/001/CursorCamo_2012asia.pdf).

SUMMARY

According to the technology disclosed in CursorCamouflage: Multiple Dummy Cursors as A Defense against Shoulder Surfing (http://www.designinterface.jp/publications/001/CursorCamo_2012asia.pdf), a personal identification number is considered not to be revealed even when others view the trajectory of a mouse cursor. However, there is still danger risk of a personal identification number being revealed since others can follow an input pattern of the personal identification number by repeatedly observing the same person input their personal identification number.

It is desirable to provide a novel and improved information processing apparatus, a novel and improved information processing method, and a novel and improved computer program capable of preventing others from surreptitiously discovering information used to authenticate a user.

According to an embodiment of the present disclosure, there is provided an information processing apparatus including an operation detection unit configured to detect an operation of a user, a display control unit configured to move and display first information formed by a plurality of first components different from each other according to a movement operation of the user detected by the operation detection unit and to fix and display second information formed by a plurality of second components different from each other, and an information acquisition unit configured to acquire, based on the selection operation, information regarding the second components displayed at positions corresponding to the first components based on a selection operation of the user detected by the operation detection unit. The information regarding the second components acquired by the information acquisition unit based on the selection operation performed at least once and information regarding the first components corresponding to the information regarding the second components are used to authenticate the user.

According to an embodiment of the present disclosure, there is provided an information processing method including detecting an operation of a user, moving and displaying first information formed by a plurality of first components different from each other according to a movement operation detected in the detecting step, and fixing and displaying second information formed by a plurality of second components different from each other, and acquiring, based on the selection operation, information regarding the second components displayed at positions corresponding to the first components based on a selection operation detected in the detecting step. The information regarding the second components acquired in the acquiring step based on the selection operation performed at least once and information regarding the first components corresponding to the information regarding the second components are used to authenticate the user.

According to an embodiment of the present disclosure, there is provided a computer program causing a computer to execute detecting an operation of a user, moving and displaying first information formed by a plurality of first components different from each other according to a movement operation detected in the detecting step, and fixing and displaying second information formed by a plurality of second components different from each other, and acquiring, based on the selection operation, information regarding the second components displayed at positions corresponding to the first components based on a selection operation detected in the detecting step. The information regarding the second components acquired in the acquiring step based on the selection operation performed at least once and information regarding the first components corresponding to the information regarding the second components are used to authenticate the user.

According to embodiments of the present disclosure described above, it is possible to provide a novel and improved information processing apparatus, a novel and improved information processing method, and a novel and improved computer program capable of preventing others from surreptitiously discovering information used to authenticate the user.

BRIEF DESCRIPTION OF THE DRAWINGS

FIG. 17A is a flowchart illustrating an example of an operation of the information processing system 1 according to an embodiment of the present disclosure;

DETAILED DESCRIPTION OF THE EMBODIMENTS

Figure 1:
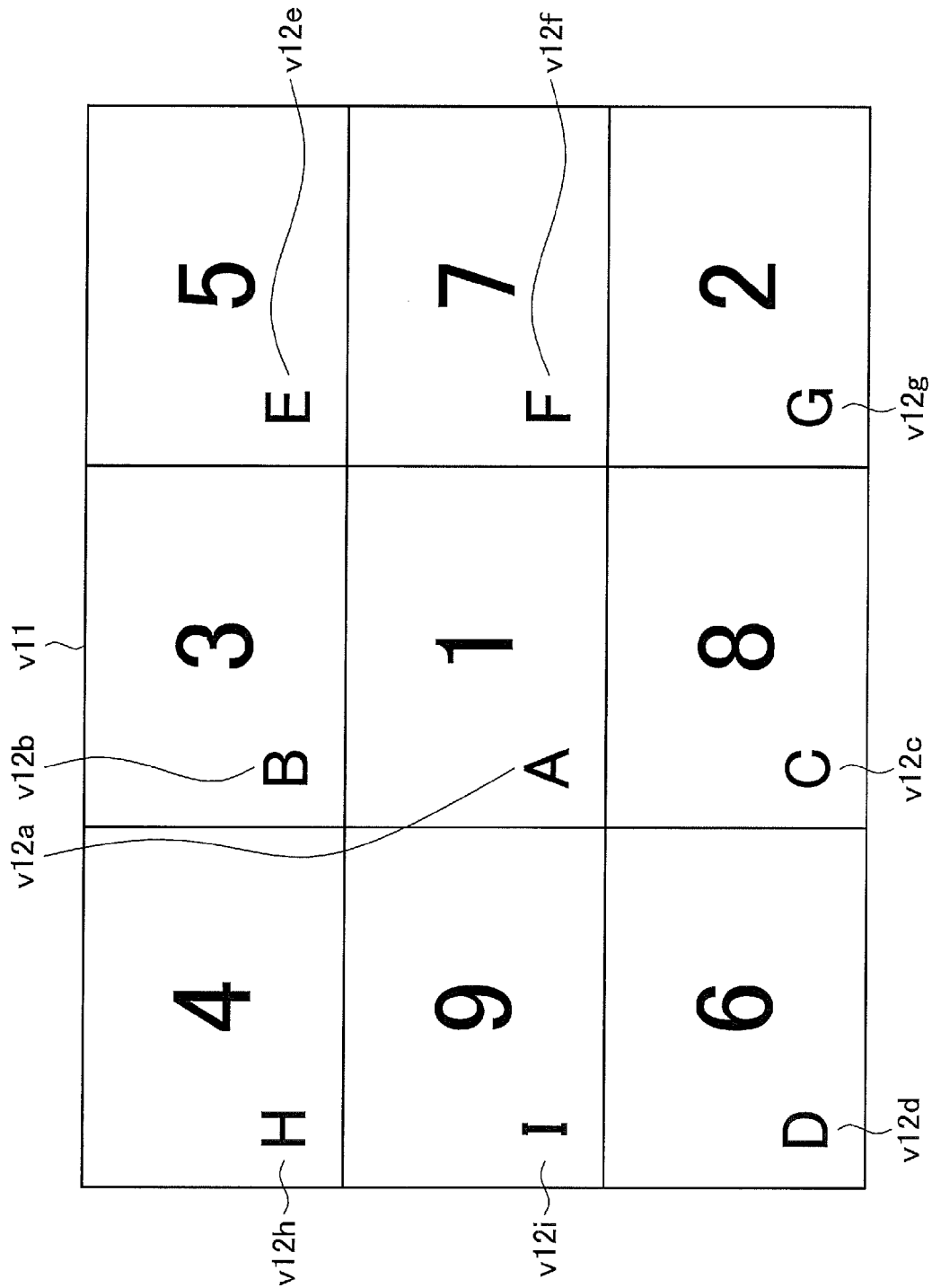
FIG. 1 is an explanatory diagram illustrating an overview of an embodiment of the present disclosure.

Hereinafter, preferred embodiments of the present disclosure will be described in detail with reference to the appended drawings. Note that, in this specification and the appended drawings, the same reference numerals are given to constituent elements having substantially the same functional configuration and repeated description thereof will be omitted.

Also, the description will be made in the following order:
<1. Embodiment of the present disclosure>
[Overview]
[Example of functional configuration of information processing system]
[Example of operation of information processing system]
[Examples of screen display]
<2. Conclusion>
<1. Embodiment Of The Present Disclosure>
[Overview]

First, an overview of an embodiment of the present disclosure will be described. In the present embodiment, a technology for preventing others from surreptitiously discovering information (for example, a personal identification number) used to authenticate a user will be described.

FIG. 1 is an explanatory diagram illustrating the overview of the embodiment of the present disclosure. FIG. 1 illustrates an example of a display screen displayed for a user to input a personal identification number according to the embodiment of the present disclosure. FIG. 1 illustrates a personal identification number display portion v11 in which numerals 1 to 9 are displayed for the user to input the personal identification number and cursor portions v12a to v12i configured by the letters A to I so that the user selects the numerals displayed in the personal identification number display portion v11.

The user can move the cursor portions v12a to v12i displayed on a screen by operating, for example, a mouse. Further, the cursor portions v12a to v12i are all interlocked to perform the same motion in response to a mouse operation of the user. Accordingly, the cursor portions v12a to v12i can function as examples of first components according to an embodiment of the present disclosure and a set of cursor portions v12a to v12i can function as an example of first information according to an embodiment of the present disclosure. Also, numerals displayed in the personal identification number display portion v11 can function as examples of second components according to an embodiment of the present disclosure and the personal identification number display portion v11 can function as an example of second information according to an embodiment of the present disclosure.

Further, when the user inputs the personal identification number, the user clicks one of the numerals 1 to 9 displayed in the personal identification number display portion v11 using the mouse in accordance with each of the letters of a password matching the personal identification number in advance and corresponding to the digits. Of course, the password matching the digits of the personal identification number is secret information which only the user knows. Thus, by causing one of the letters displayed as the cursor portions v12a to v12i to correspond to one of the numerals 1 to 9 displayed in the personal identification number display portion v11 and allowing the user to perform operation selection, it is possible to prevent others from surreptitiously discovering information used to authenticate the user.

An actual input example will be described in detail. FIGS. 2 to 6 are explanatory diagrams illustrating the overview of the embodiment of the present disclosure. FIGS. 2 to 6 show a screen display example when the user inputs the personal identification number by operating the cursor portions v12a to v12i using a mouse or the like to select numerals displayed in the personal identification number display portion v11.

In the following example, a case in which the user attempts to input the following personal identification number and password will be described. Also, both of the personal identification number and the password are assumed to be memorized by the user:

Personal identification number: 31413, and
Password: CAHBE.

That is, a screen display example when the user inputs the personal identification number will be described in the case in which the first digit "3" of the personal identification number corresponds to the first letter "C" of the password, the second digit "1" of the personal identification number corresponds to the second letter "A" of the password, the third digit "4" of the personal identification number corresponds to the third letter "H" of the password, the fourth digit "1" of the personal identification number corresponds to the fourth letter "B" of the password, and the fifth digit "3" of the personal identification number corresponds to the fifth letter "E" of the password.

Figure 2:
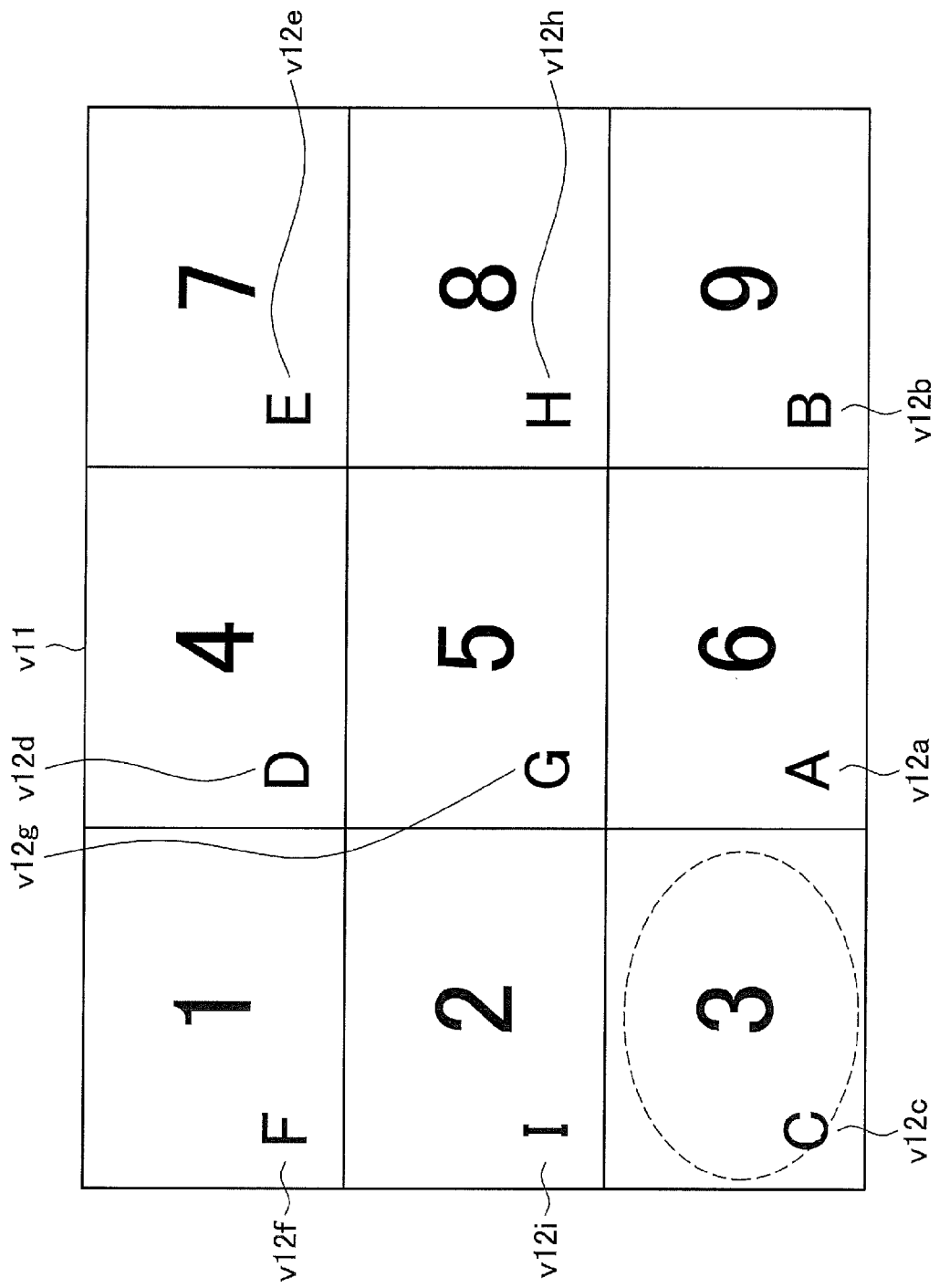
FIG. 2 is an explanatory diagram illustrating an overview of an embodiment of the present disclosure.

First, as illustrated in FIG. 2, the user operates the cursor portions v12a to v12i using the mouse or the like, moves the cursor portion v12c in which the first letter "C" of the password memorized by the user is displayed to the area of "3" among the numerals displayed in the personal identification number display portion v11, and selects "3" through clicking or the like of the mouse. Through the operation of the user, the first digit "3" of the personal identification number is input to correspond to the first letter "C" of the password.

Also, when the user selects the first digit of the personal identification number, arrangement of the numerals displayed in the personal identification number display portion v11 and/or arrangement of the cursor portions v12a to v12i may vary at random. In the following description, when the user selects one digit of the personal identification number, the arrangement of the numerals displayed in the personal identification number display unit v11 and the arrangement of the cursor portions v12a to v12i are assumed to vary at random. Of course, only one of the arrangement of the numerals displayed in the personal identification number display unit v11 and the arrangement of the cursor portions v12a to v12i may vary at random.

Figure 3:
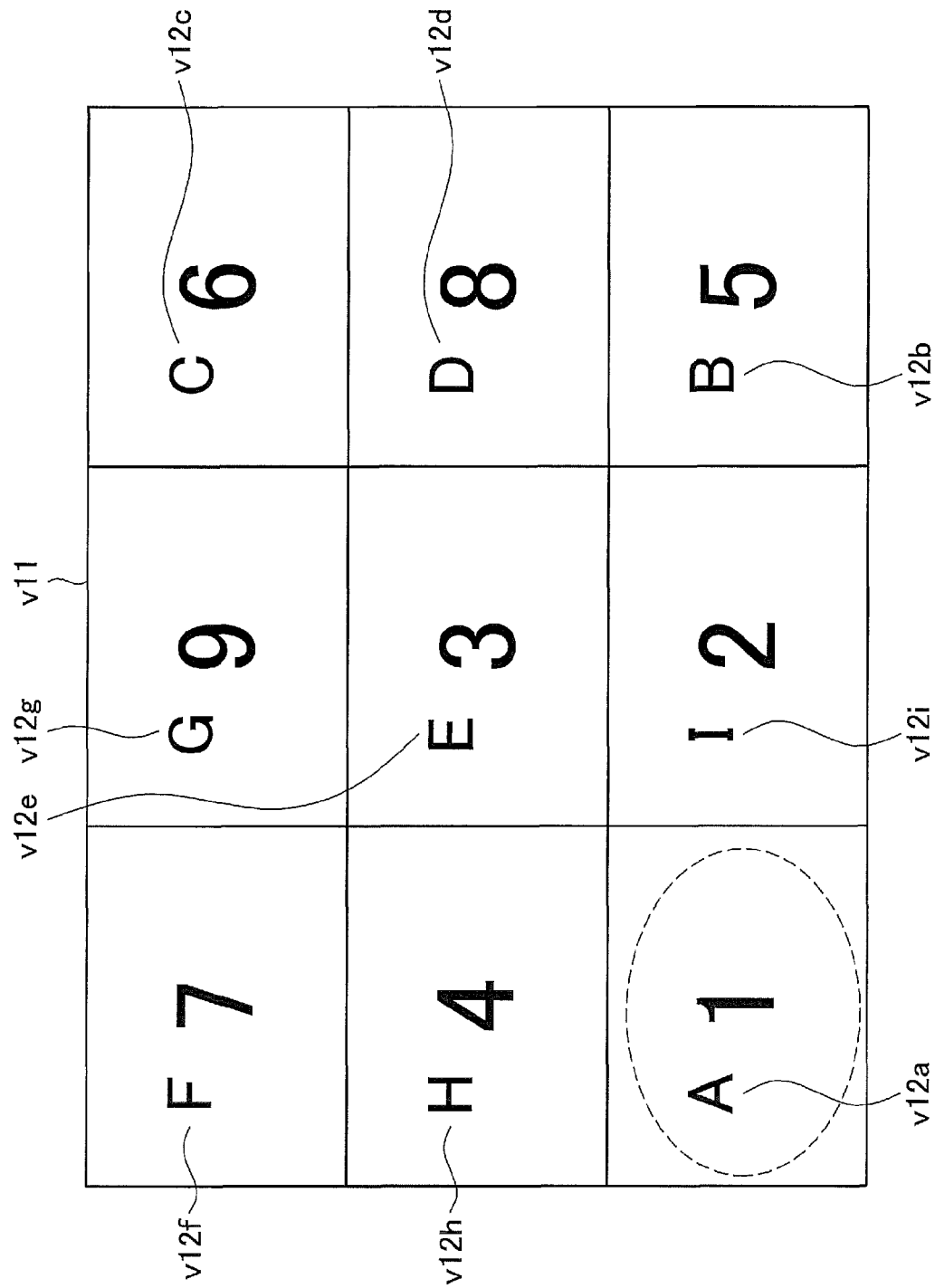
FIG. 3 is an explanatory diagram illustrating an overview of an embodiment of the present disclosure.

Subsequently, as illustrated in FIG. 3, the user operates the cursor portions v12a to v12i using the mouse or the like, moves the cursor portion v12a in which the second letter "A" of the password memorized by the user is displayed to the area of "1" among the numerals displayed in the personal identification number display portion v11, and selects "1" through clicking or the like of the mouse. Through the operation of the user, the second digit "1" of the personal identification number is input to correspond to the second letter "A" of the password.

Figure 4:
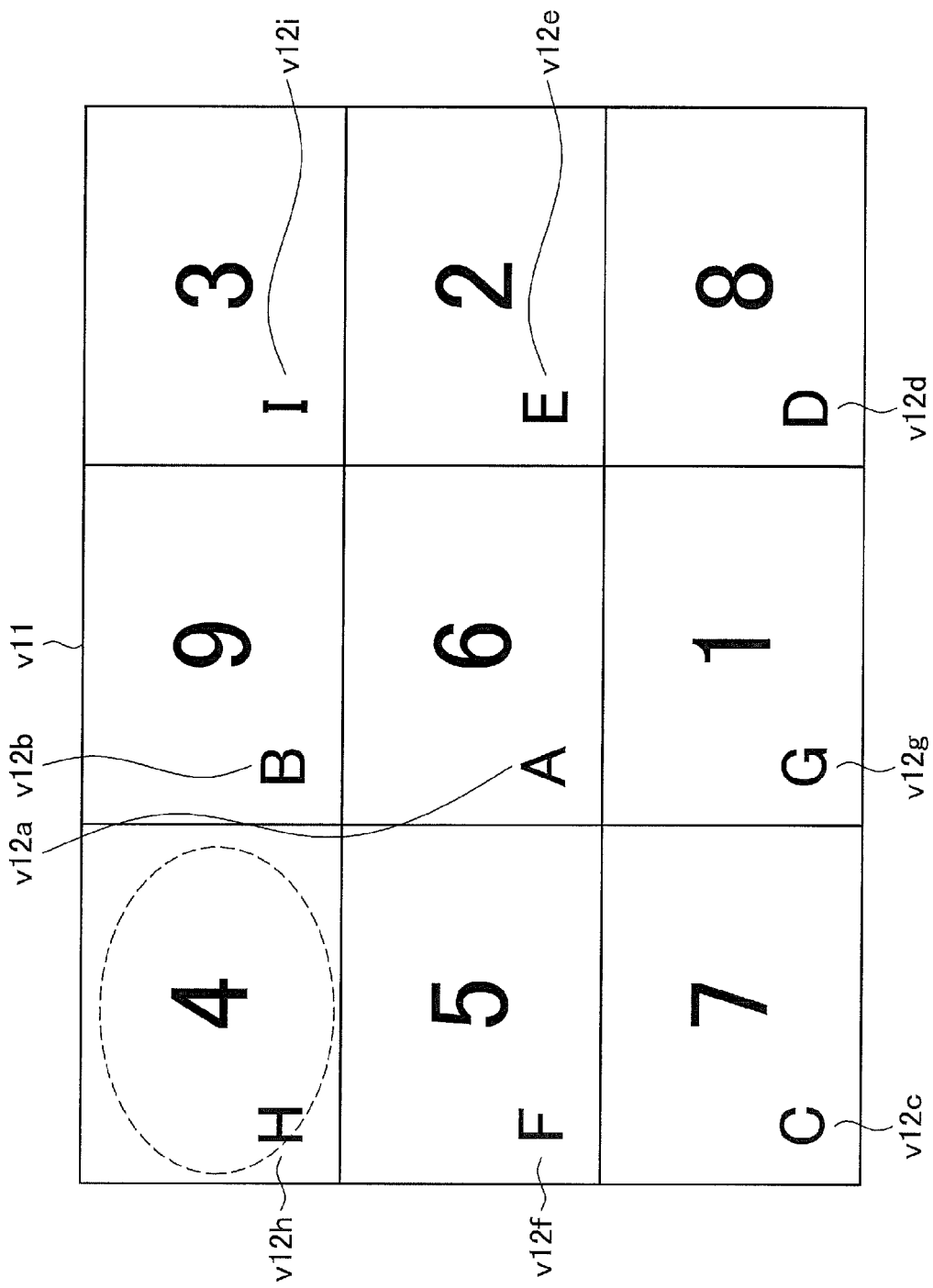
FIG. 4 is an explanatory diagram illustrating an overview of an embodiment of the present disclosure.

Subsequently, as illustrated in FIG. 4, the user operates the cursor portions v12a to v12i using the mouse or the like, moves the cursor portion v12h in which the third letter "H" of the password memorized by the user is displayed to the area of "4" among the numerals displayed in the personal identification number display portion v11, and selects "4" through clicking or the like of the mouse. Through the operation of the user, the third digit "4" of the personal identification number is input to correspond to the third letter "H" of the password.

Figure 5:
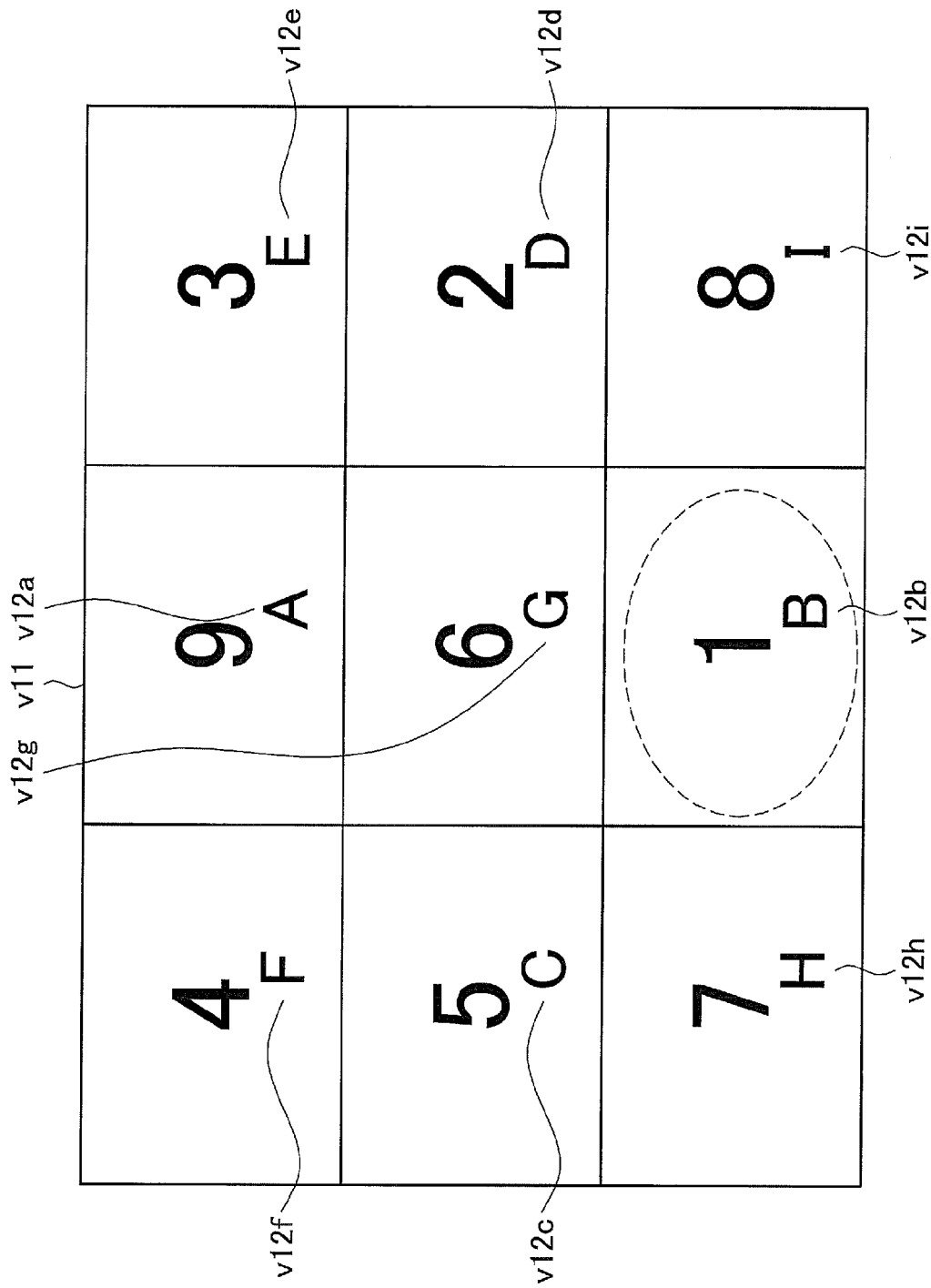
FIG. 5 is an explanatory diagram illustrating an overview of an embodiment of the present disclosure.

Subsequently, as illustrated in FIG. 5, the user operates the cursor portions v12a to v12i using the mouse or the like, moves the cursor portion v12b in which the fourth letter "B" of the password memorized by the user is displayed to the area of "1" among the numerals displayed in the personal identification number display portion v11, and selects "1" through clicking or the like of the mouse. Through the operation of the user, the fourth digit "1" of the personal identification number is input to correspond to the fourth letter "B" of the password.

Figure 6:
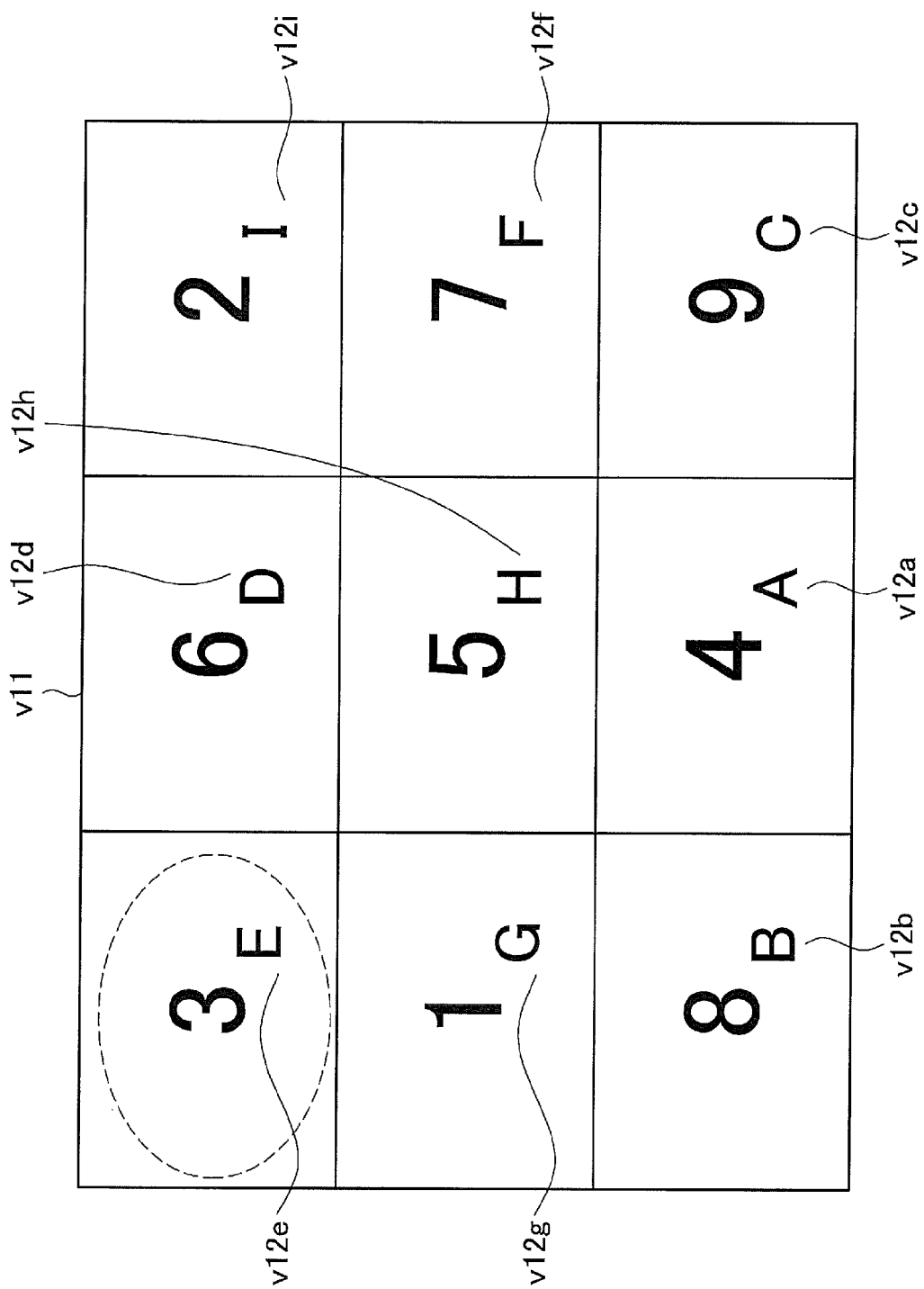
FIG. 6 is an explanatory diagram illustrating an overview of an embodiment of the present disclosure.

Finally, as illustrated in FIG. 6, the user operates the cursor portions v12a to v12i using the mouse or the like, moves the cursor portion v12e in which the fifth letter "E" of the password memorized by the user is displayed to the area of "3" among the numerals displayed in the personal identification number display portion v11, and selects "3" through clicking or the like of the mouse. Through the operation of the user, the fifth digit "3" of the personal identification number is input to correspond to the fifth letter "E" of the password.

When the user inputs the personal identification number, the user can input the associated password together by operating the cursor portions v12a to v12i using the mouse or the like and sequentially selecting the numerals displayed in the personal identification number display unit v11 in this way. Based on the input personal identification number and password, an apparatus performing a process of authenticating a user concludes whether the correct personal identification number and password are input by the user.

In the embodiment of the present disclosure, by displaying the cursor portions v12a to v12i in the interlocking manner in this way, it is possible to prevent others from surreptitiously discovering the information used to authenticate the user. This is because, since all of the cursor portions v12a to v12i perform the same motion, others may not distinguish at a glance which personal identification number is input by the user and which password corresponds to the personal identification number. Accordingly, in the embodiment of the present disclosure, when users input personal identification numbers in public places or the like, it is possible to considerably reduce a risk of leakage of the personal identification numbers. Also, by causing display intervals of the numerals displayed in the personal identification number display portion v11 to be identical with display intervals of the cursor portions v12a to v12i, the user can match the other cursor portions with the other numerals when the user matches one of the cursor portions v12a to v12i with one of the numerals displayed in the personal identification number display portion v11. Therefore, others may not distinguish at a glance which numeral the user intends to select.

Also, in the example illustrated in FIG. 1 and the like, the cursor portions v12a to v12i are configured as the letters A to I, but embodiments of the present disclosure are not limited to the related example. Modification examples in which portions are displayed as the cursor portions v12a to v12i will be described in detail later. Also, in the example illustrated in FIG. 1, the numerals are shown in a matrix of 3 rows×3 columns in the personal identification number display portion v11, but embodiments of the present disclosure are not limited to the related example.

The overview of the embodiment of the present disclosure has been described above. Next, a configuration and an operation for realizing the embodiment of the present disclosure described in the foregoing overview will be described in detail.

[Example of Functional Configuration of Information Processing System]

Figure 7:
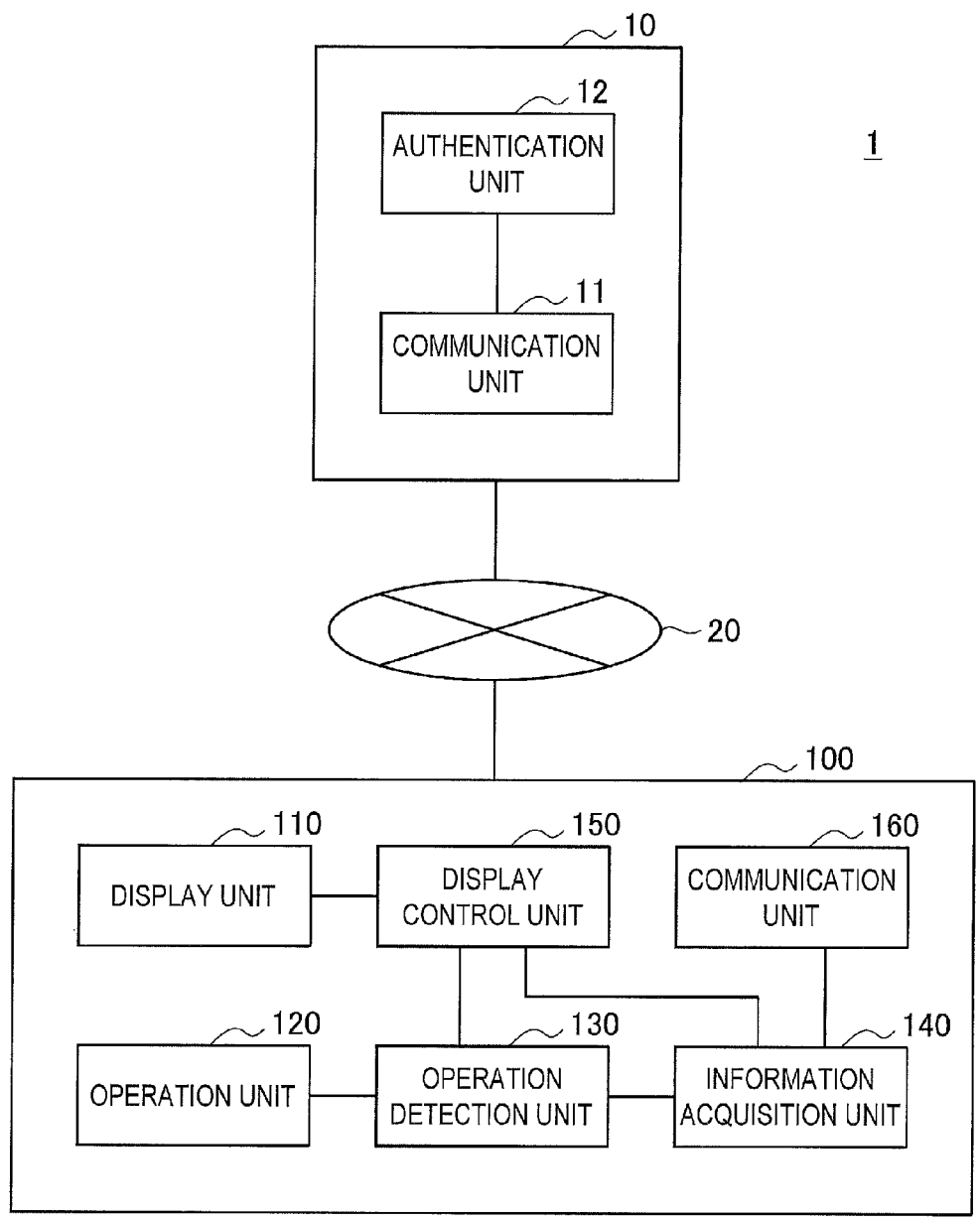
FIG. 7 is an explanatory diagram illustrating an example of the configuration of an information processing system according to an embodiment of the present disclosure.

FIG. 7 is an explanatory diagram illustrating an example of the configuration of an information processing system according to the embodiment of the present disclosure. FIG. 7 illustrates an example of the configuration of the information processing system that performs user authentication when a personal identification number and a password are input, as described in the foregoing overview. Hereinafter, the example of the configuration of the information processing system according to the embodiment of the present disclosure will be described with reference to FIG. 7.

As illustrated in FIG. 7, an information processing system 1 according to the embodiment of the present disclosure is configured to include a server apparatus 10 and an information processing apparatus 100. Also, in the example illustrated in FIG. 7, the server apparatus 10 and the information processing apparatus 100 are connected via a network 20.

The server apparatus 10 is an apparatus that performs a user authentication process using a personal identification number and a password input with the information processing apparatus 100. The server apparatus 10 is an apparatus that provides, for example, a service such as an online shopping service or a social network service (SNS) to a user.

The information processing apparatus 100 is an apparatus that is used, for example, when a user logs into a service provided by the server apparatus 10 to use the service. Examples of the information processing apparatus 100 include a desktop type personal computer, a notebook type personal computer, a tablet terminal, a mobile phone, a smartphone, a game apparatus, and a music reproduction apparatus. Also, an example of the information processing apparatus 100 is an automated teller machine (ATM) that allows users to withdraw cash by inputting personal identification numbers.

In the information processing system 1 according to the embodiment of the present disclosure, the user authentication process is performed using the information processing apparatus 100 based on a user ID identifying a user, and a personal identification number and a password corresponding to the user ID in order to use a service provided by the server apparatus 10.

As illustrated in FIG. 7, the information processing apparatus 100 according to the embodiment of the present disclosure is configured to include a display unit 110, a operation unit 120, a operation detection unit 130, an information acquisition unit 140, a display control unit 150, and a communication unit 160.

The display unit 110 displays text, images, and other information under the control of the display control unit 150. Examples of the display unit 110 include a liquid crystal display panel, an organic EL display panel, and other display devices.

In the present embodiment, when the user inputs the personal identification number and the password to use the service provided by the server apparatus 10, the personal identification number display portion v11 and the cursor portions v12a to v12i illustrated in FIGS. 1 to 6 are displayed on the display unit 110.

The operation unit 120 is an input device configured for the user to perform an input operation on the information processing apparatus 100 and can be formed of, for example, an input device such as a keyboard, a mouse, a touch pad, or a touch panel. The content of the input operation of the user using the operation unit 120 is detected by the operation detection unit 130. The user can operate the cursor portions v12a to v12i illustrated in FIGS. 1 to 6 using the operation unit 120 to select one numeral among the numerals displayed in the personal identification number display unit v11.

The operation detection unit 130 detects the content of the input operation of the user using the operation unit 120. For example, the operation detection unit 130 can detect, for example, which key of a keyboard is pressed by the user, which movement operation is performed with the mouse, which coordinates are clicked with the mouse on the display unit 110, and whether the click is a left click or a right click. The operation detection unit 130 transmits the detected content of the input operation to the information acquisition unit 140 and the display control unit 150.

The information acquisition unit 140 acquires information based on the contents of the input operation performed by the user using the operation unit 120 and transmitted from the operation detection unit 130. For example, in the present embodiment, based on the mouse clicking operation of the user, the information acquisition unit 140 acquires a pair of one numeral in the personal identification number display portion v11 displayed on the display unit 110 and the letter corresponding to one of the cursor portions v12a to v12i. When the information acquisition unit 140 acquires the information based on the contents of the input operation performed by the user using the operation unit 120, the information acquisition unit 140 transmits the acquired information to the display control unit 150. Also, the information acquisition unit 140 can also transmit the acquired information to the communication unit 160.

The display control unit 150 controls the display of information on the display unit 110. The display control unit 150 can control the display of the information on the display unit 110 based on the content of the input operation performed by the user and detected by the operation detection unit 130. Also, the display control unit 150 can control the display of the information on the display unit 110 based on the information acquired by the information acquisition unit 140 based on the content of the input operation performed by the user using the operation unit 120.

In the present embodiment, when the personal identification number display portion v11 and the cursor portions v12a to v12i illustrated in FIG. 1 and the like are displayed on the display unit 110 and the user moves the mouse, the display control unit 150 moves the cursor portions v12a to v12i displayed on the display unit 110 in an interlocking manner. At this time, when the cursor portions v12a to v12i protrude from the personal identification number display portion v11 due to the movement of the mouse, the display control unit 150 can perform control such that the cursor portions v12a to v12i are displayed from the facing side of the personal identification number display portion v11.

Figure 8:
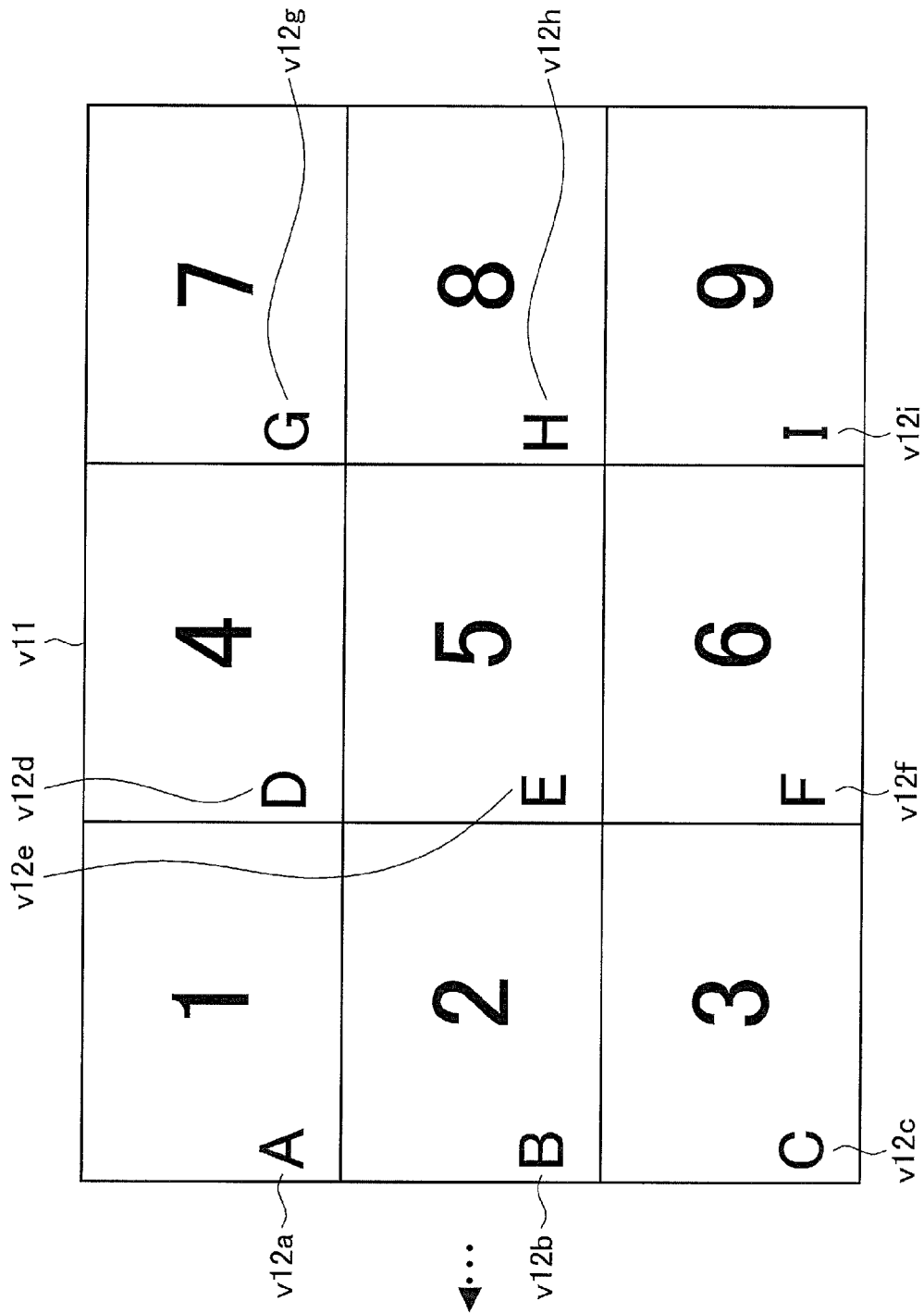
FIG. 8 is an explanatory diagram illustrating an example of display control of cursor portions v12a to v12i by a display control unit 150.
Figure 9:
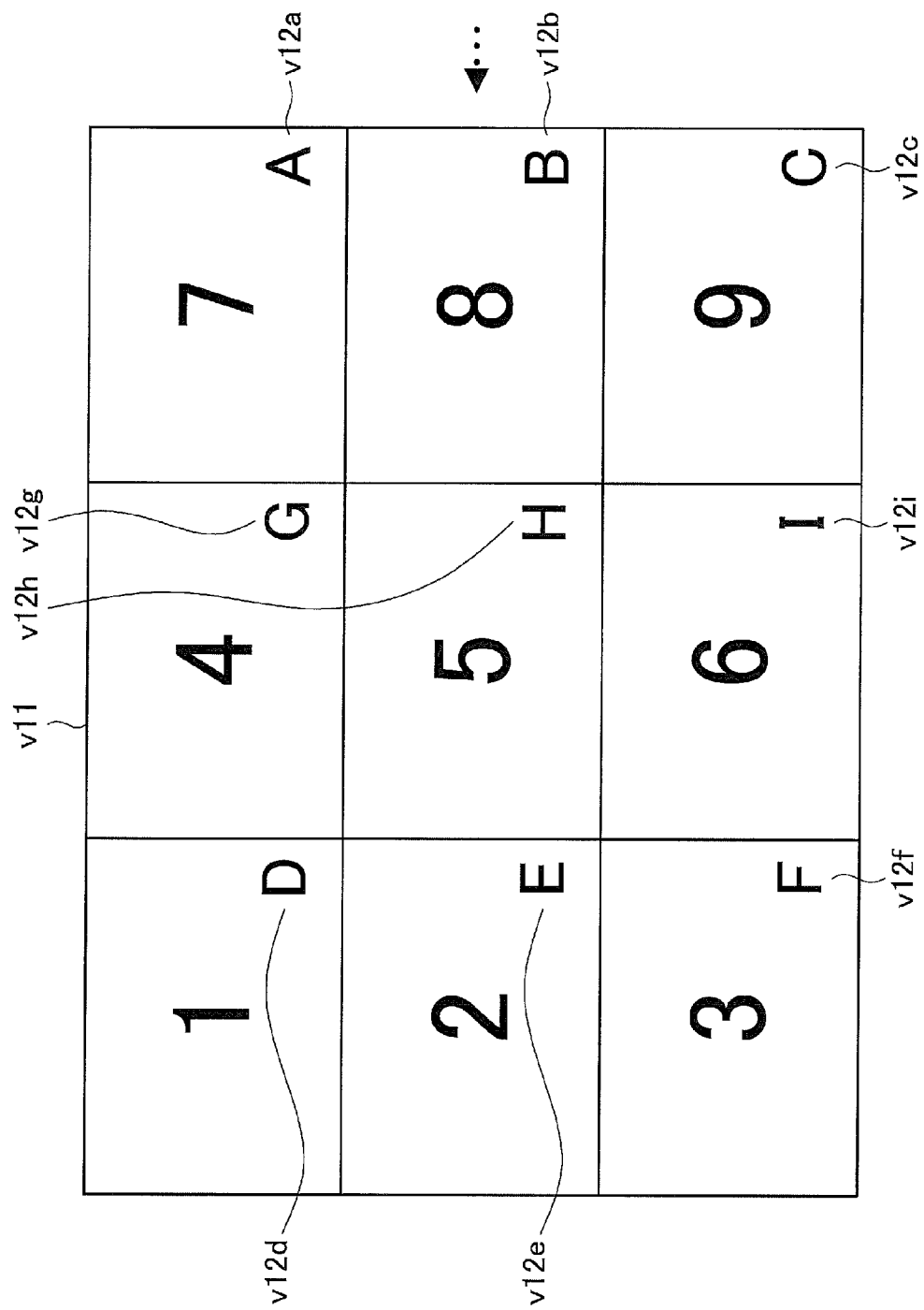
FIG. 9 is an explanatory diagram illustrating an example of display control of cursor portions v12a to v12i by a display control unit 150.

FIGS. 8 and 9 are explanatory diagrams illustrating an example of display control of the cursor portions v12a to v12i by the display control unit 150. As illustrated in FIG. 8, the user is assumed to move the mouse to the left side when the cursor portions v12a to v12i are displayed on the display unit 110. Then, the cursor portions v12a, v12b, and v12c in the left end may protrude from the personal identification number display portion v11. Accordingly, as illustrated in FIG. 9, the display control unit 150 controls display of the display unit 110 such that the cursor portions v12a, v12b, and v12c are displayed from the right side of the personal identification number display portion v11.

In FIGS. 8 and 9, the example in which the cursor portions v12a to v12i are moved in the right and left directions has been described. However, of course, the display control unit 150 can control the display of the cursor portions v12a to v12i even when the cursor portions v12a to v12i are moved up and down.

The communication unit 160 transmits and receives data to and from the server apparatus 10 via the network 20. In the present embodiment, the communication unit 160 transmits the personal identification number and the password input through the input operation of the user using the operation unit 120 to the server apparatus 10. The server apparatus 10 performs the user authentication process based on the personal identification number and the password transmitted from the communication unit 160 and decides whether the service for the user can be provided.

Also, in the example illustrated in FIG. 7, the display unit 110 is configured to be included in the information processing apparatus 100, but embodiments of the present disclosure are not limited to the related example. It is needless to say that an embodiment of the present disclosure can be applied regardless of whether the display unit 110 is provided separately from the information processing apparatus 100 or the display unit 110 is connected to the information processing apparatus 100.

Also, as illustrated in FIG. 7, the server apparatus 10 according to the embodiment of the present disclosure is configured to include a communication unit 11 and an authentication unit 12.

The communication unit 11 transmits and receives data to and from the information processing apparatus 100 via the network 20. In the present embodiment, the communication unit 11 receives the personal identification number and the password input to the information processing apparatus 100, from the information processing apparatus 100 via the network 20. The personal identification number and the password received by the communication unit 11 are used for an authentication process in the authentication unit 12.

The authentication unit 12 performs the user authentication process based on the personal identification number and the password received by the communication unit 11 and decides whether the service for the user can be provided. For example, the authentication unit 12 first causes the user to input a user ID and performs the user authentication process according to whether the personal identification number and the password registered in advance in association with the user ID are identical with the personal identification number and the password received by the communication unit 11.

Since the information processing apparatus 100 included in the information processing system 1 according to the embodiment of the present disclosure has the configuration illustrated in FIG. 7, the same personal identification number display portion v11 and the cursor portions v12a to v12i illustrated in FIGS. 1 to 6 can be displayed on the display unit 110. Further, since the information processing apparatus 100 included in the information processing system 1 according to the embodiment of the present disclosure has the configuration illustrated in FIG. 7, the cursor portions v12a to v12i can be displayed in the interlocking manner and others can be prevented from surreptitiously discovering the information used to authenticate the user.

Also, in the example illustrated in FIG. 7, the information processing apparatus 100 causing a user to input a personal identification number and a password and the server apparatus 10 performing the user authentication process based on the input personal identification number and password are configured as different apparatuses, but embodiments of the present disclosure are not limited to the related example. An apparatus causing a user to input a personal identification number and a password and an apparatus performing the user authentication process based on the personal identification number and the password may be the same apparatus.

The example of the configuration of the information processing system according to the embodiment of the present disclosure has been described with reference to FIG. 7. Next, an example of an operation of the information processing system 1 according to the embodiment of the present disclosure will be described.

[Example of Operation of Information Processing System]

Figure 10:
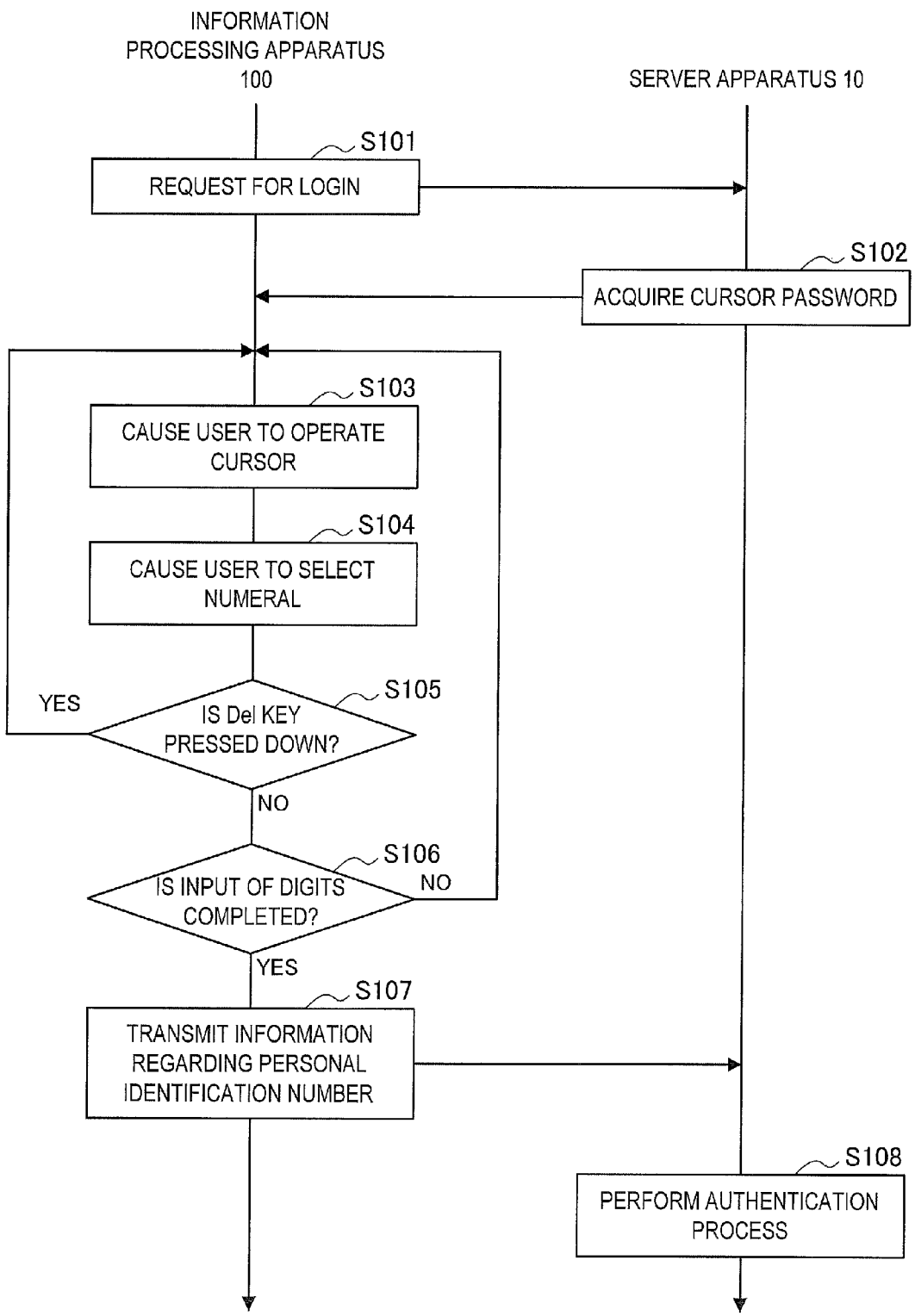
FIG. 10 is a flowchart illustrating an example of an operation of an information processing system 1 according to an embodiment of the present disclosure.

FIG. 10 is a flowchart illustrating an example of an operation of the information processing system 1 according to the embodiment of the present disclosure. The example illustrated in FIG. 10 is an example of an operation of the information processing system 1 when the user of the information processing apparatus 100 attempts to log into a service provided by the server apparatus 10. Hereinafter, the example of the operation of the information processing system 1 according to the embodiment of the present disclosure will be described with reference to FIG. 10.

First, the information processing apparatus 100 gives the server apparatus 10 a request for a user login to the service provided by the server apparatus 10 (step S101). The request for the login in step S101 can be performed, for example, when the user of the information processing apparatus 100 inputs a user ID on a login page or the like. Specifically, the request for the login by the information processing apparatus 100 can be performed, for example, in such a manner that the information acquisition unit 140 acquires the input user ID and the communication unit 160 transmits information including the user ID to the server apparatus 10.

The server apparatus 10 receiving the request for the login from the information processing apparatus 100 acquires the password (cursor password) corresponding to the user (step S102). When the server apparatus 10 acquires the password corresponding to the user, the server apparatus 10 transmits information regarding the password to the information processing apparatus 100. The password transmitted from the server apparatus 10 is used when the personal identification number is input to the information processing apparatus 100 using the cursor portions v12a to v12i.

Of course, the information processing apparatus 100 does not display the password acquired from the server apparatus 10 on a screen. The information processing apparatus 100 uses the acquired password when the personal identification number is selected by the user. That is, the information processing apparatus 100 uses the acquired password to conclude whether numerals selected by certain cursor portions among the cursor portions v12a to v12i are used as the personal identification number input by the user, as illustrated in FIGS. 2 to 6.

The example illustrated in FIGS. 2 to 6 will be described again. When the password corresponding to the user attempting the login is CAHBE, the information processing apparatus 100 acquires numerals according to a selection operation (for example, a mouse clicking operation) of the user using the operation unit 120 in the order of the cursor portions v12c, v12a, v12h, v12b, and v12e.

When the information processing apparatus 100 acquires the information regarding the password from the server apparatus 10, the information processing apparatus 100 causes the display unit 110 to display the personal identification number display portion v11 and the cursor portions v12a to v12i, as illustrated in FIGS. 1 to 6. Then, the information processing apparatus 100 causes the user to operate the cursor portions v12a to v12i using the operation unit 120 (step S103) and causes the user to select one numeral among the numerals displayed in the personal identification number display portion v11 through a selection operation (for example, a mouse clicking operation) using the operation unit 120 (step S104).

Subsequently, the information processing apparatus 100 determines whether the user performs a operation (for example, presses a Delete button of a keyboard) using the operation unit 120 to delete the selected numeral (step S105). The determination of step S105 can be performed by the operation detection unit 130. When the operation is performed to delete the selected numeral as the result of the determination of step S105, the information processing apparatus 100 returns the process to step S103 and causes the user to operate the cursor portions v12a to v12i using the operation unit 120.

Conversely, when it is determined in step S105 that no operation is performed to delete the selected numeral, the information processing apparatus 100 subsequently determines whether an input of numerals of the digits of the personal identification number is completed (step S106). The determination of step S106 can be performed by, for example, the information acquisition unit 140. In the above-described example, it is determined whether the input of 5 digits is completed.

When it is determined in step S106 that the input of the numerals of the personal identification number is not completed, the information processing apparatus 100 returns the process to step S103 and causes the user to operate the cursor portions v12a to v12i using the operation unit 120. Conversely, when it is determined in step S106 that the input of the numerals of the personal identification number is completed, the information processing apparatus 100 transmits information regarding the input personal identification number to the server apparatus 10 (step S107). The information processing apparatus 100 transmits, for example, information obtained by encoding the input personal identification number with a hash function such as SHA-1, 2, or 3 as the information regarding the input personal identification number.

The server apparatus 10 performs the user authentication process based on the personal identification number transmitted from the information processing apparatus 100 (step S108). The server apparatus 10 performs the user authentication process according to whether the personal identification number registered in advance is identical with the personal identification number transmitted from the information processing apparatus 100. In the example illustrated in FIGS. 2 to 6, the server apparatus 10 performs the user authentication process according to whether numerals obtained at the time of the selection operation in the order of the cursor portions v12c, v12a, v12h, v12b, and v12e are identical with "31413." When the numerals are identical with "31314," the server apparatus 10 permits the user to use the service. When the numerals are not identical with "31314," the server apparatus 10 does not permit the user to use the service.

Since the information processing apparatus 100 included in the information processing system 1 according to the embodiment of the present disclosure performs the operation illustrated in FIG. 10, the cursor portions v12a to v12i can be displayed in the interlocking manner and others can be prevented from surreptitiously discovering the information used to authenticate the user.

In the example of the above-described operation, the case in which the user attempts to log into the service provided by the server apparatus 10 has been described, but it is needless to say that embodiments of the present disclosure can be applied in other situations. For example, when users send money to others' accounts through a so-called Internet banking service, the users are generally caused to input personal identification numbers. However, by applying embodiments of the present disclosure when the personal identification numbers are input, the processes described in the example of the above-described operation can be performed.

When the information processing apparatus 100 causes the user to select one numeral among the numerals displayed in the personal identification number display portion v11 through a selection operation (for example, a mouse clicking operation) using the operation unit 120, the information processing apparatus 100 may change a sequence of the numerals displayed in the personal identification number display portion v11 or the cursor portions v12a to v12i at random, as illustrated in FIGS. 2 to 6.

Figure 11:
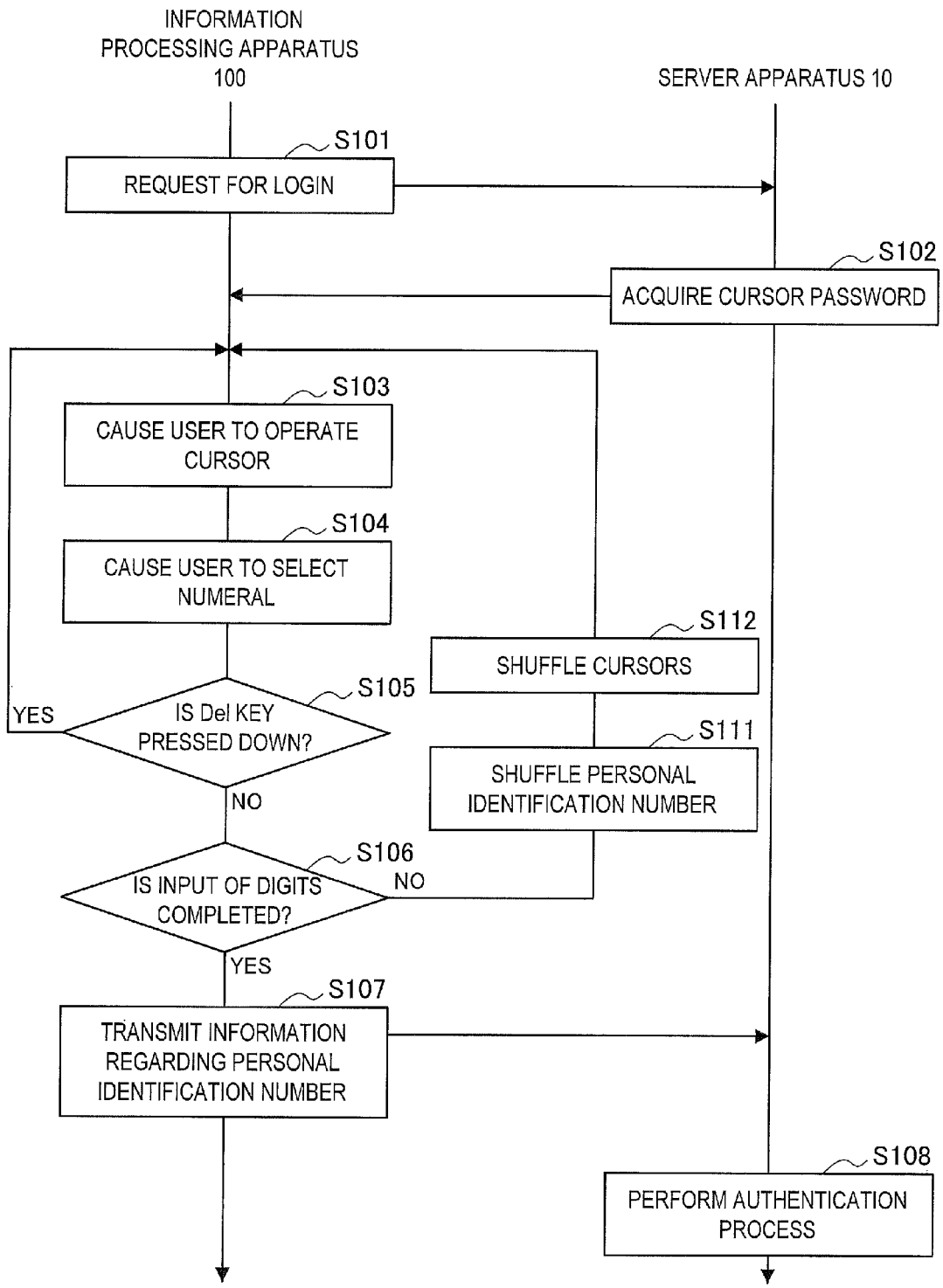
FIG. 11 is a flowchart illustrating an example of an operation of an information processing system 1 according to an embodiment of the present disclosure.

FIG. 11 is a flowchart illustrating an example of an operation of the information processing system 1 according to the embodiment of the present disclosure. The example illustrated in FIG. 11 is an example of an operation of the information processing system 1 when the user of the information processing apparatus 100 attempts to log into the service provided by the server apparatus 10. Hereinafter, the example of the operation of the information processing system 1 according to the embodiment of the present disclosure will be described with reference to FIG. 11.

In the flowchart illustrated in FIG. 11, since the processes of steps S101 to S108 are the same as those illustrated in FIG. 10, the description thereof will be omitted here. In the flowchart illustrated in FIG. 11, two processes of steps S110 and S111 are added to the flowchart illustrated in FIG. 10.

That is, when it is determined in step S106 that the input of the numerals of the personal identification number is not completed, the information processing apparatus 100 changes the sequence of the numerals displayed in the personal identification number display portion v11 at random (step S110) and further changes the sequence of the cursor portions v12a to v12i at random (step S111), before return to step S103

Thus, by changing the numerals displayed in the personal identification number display portion v11 or the sequence of the cursor portions v12a to v12i at random when the user selects the numerals one by one, the information processing apparatus 100 can make it more difficult for the personal identification number of the user to be surreptitiously leaked to others.

[Examples of Screen Display]

Figure 12:
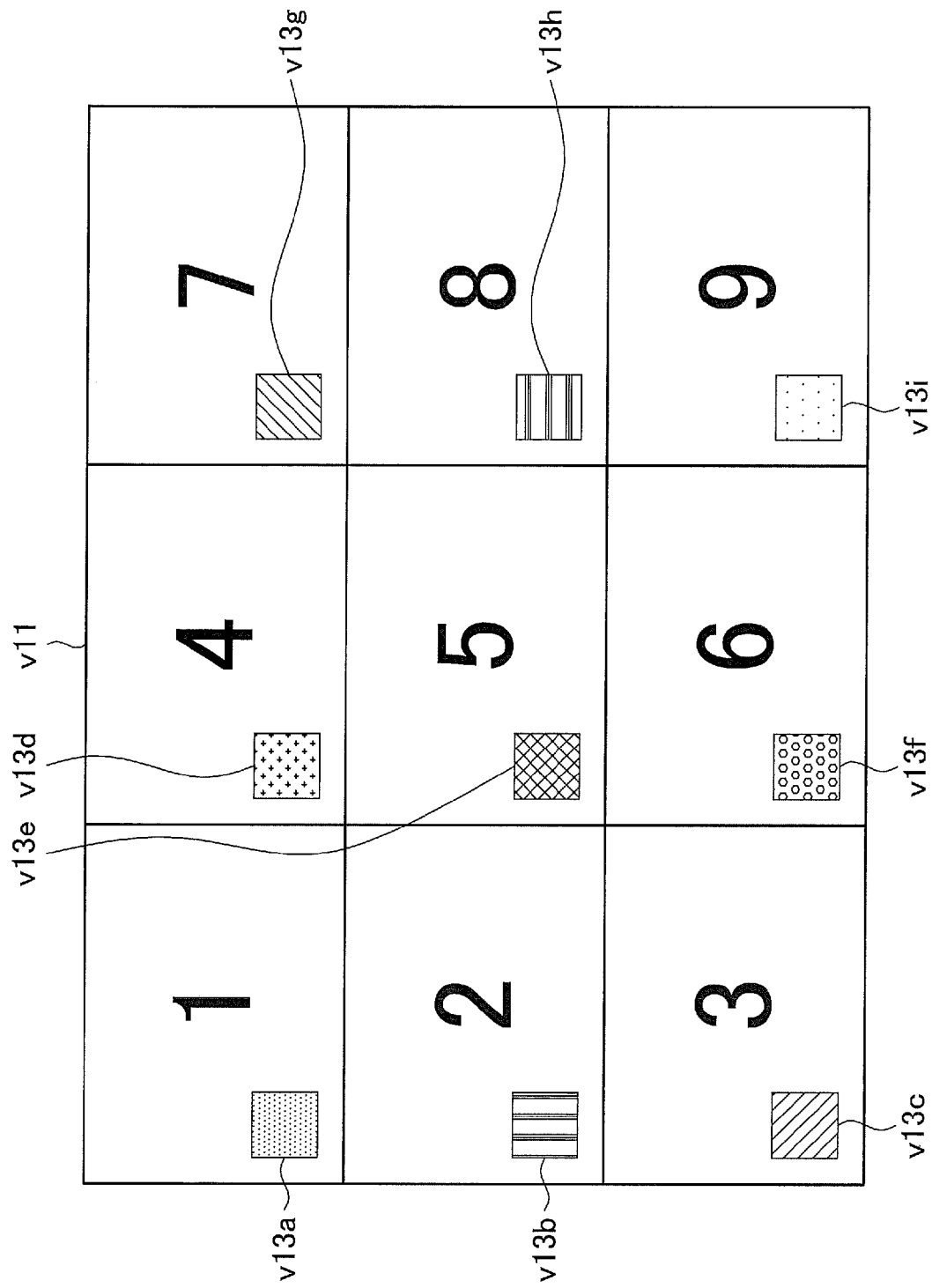
FIG. 12 is an explanatory diagram illustrating an example of a screen displayed on a display unit 110 by an information processing apparatus 100.

Next, another display example of the cursor portions by the information processing apparatus 100 according to the present embodiment will be described. FIG. 12 is an explanatory diagram illustrating an example of a screen displayed on the display unit 110 by the information processing apparatus 100. In FIG. 12, a personal identification number display portion v11 and cursor portions v13a to v13i are illustrated. The cursor portions v13a to v13i are assumed to all be squares and to be mutually different colors (in FIG. 12, mutually different patterns of the cursor portions v13a to v13i are illustrated for convenience).

In the following description, it is assumed that the cursor portion v13a is blue, the cursor portion v13b is orange, the cursor portion v13c is grey, the cursor portion v13d is yellow, the cursor portion v13e is red, the cursor portion v13*f* is green, the cursor portion v13*g* is black, the cursor portion v13*h* is purple, and the cursor portion v13*i* has ocher. Of course, it is needless to say that the kinds or sequence of the colors are not limited to the related example.

The user attempting to log into the service using the information processing apparatus 100 displaying the cursor portions v13*a* to v13*i* illustrated in FIG. 12 memorizes the order of colors used at the time of input of a personal identification number in advance and registers the memorized order of the colors in the server apparatus 10. For example, when the order of the colors used at the time of the input of the personal identification number is set to be green, blue, purple, and grey, the numerals selected in the order of the cursor portions v13*f*, v13*a*, v13*h*, and v13*c* selected by the user become the personal identification number to be input.

Figure 13:
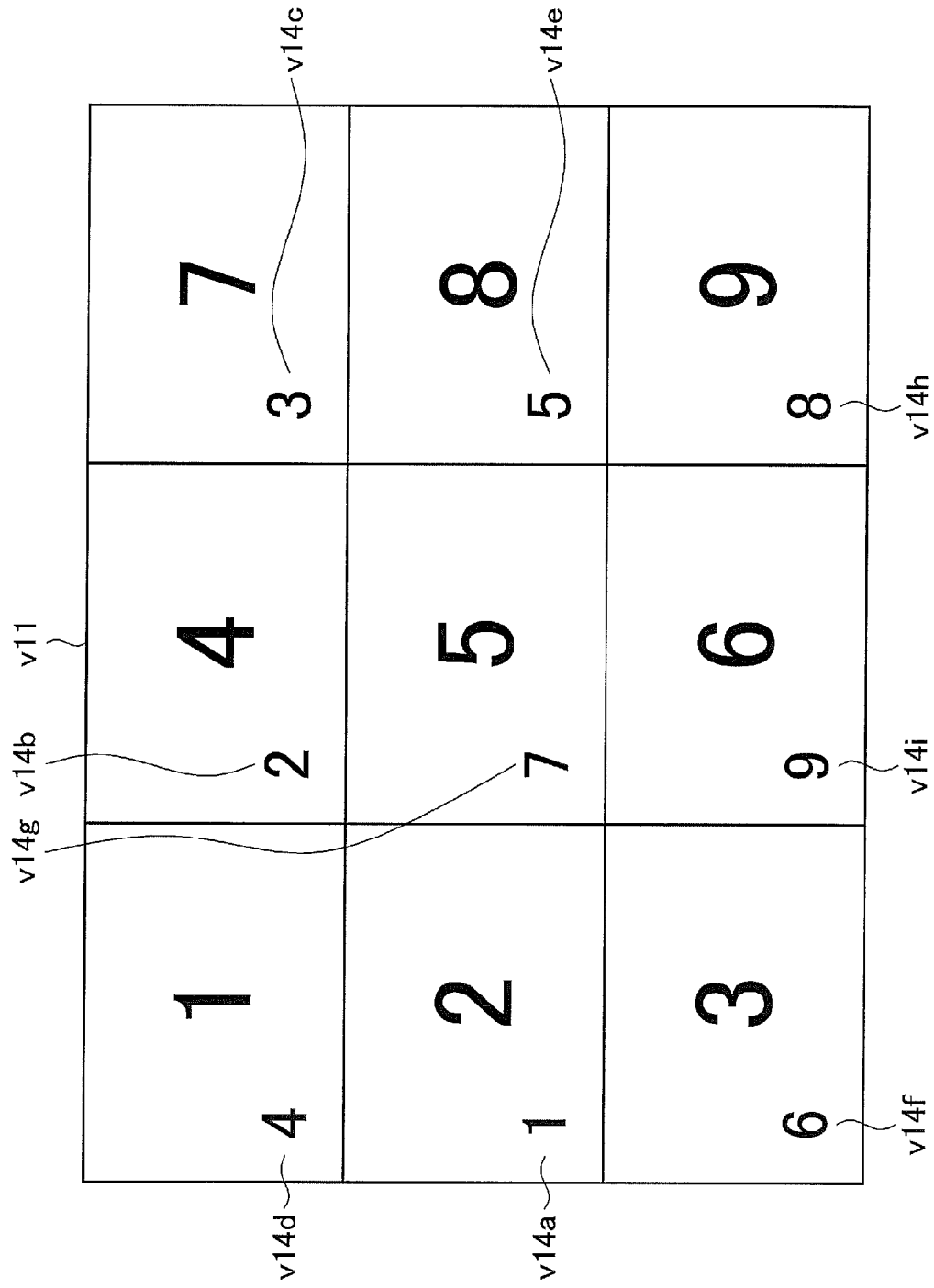
FIG. 13 is an explanatory diagram illustrating an example of a screen displayed on a display unit 110 by an information processing apparatus 100.

FIG. 13 is an explanatory diagram illustrating an example of a screen displayed on the display unit 110 by the information processing apparatus 100. In FIG. 13, a personal identification number display portion v11 and cursor portions v14*a* to v14*i* are illustrated. The cursor portions v14*a* to v14*i* all have numeral forms and have mutually different numerals.

The user attempting to log into the service using the information processing apparatus 100 displaying the cursor portions v14*a* to v14*i* illustrated in FIG. 13 memorizes the order of numerals used at the time of input of a personal identification number in advance and registers the memorized order of the numerals in the server apparatus 10. For example, when the order of the numerals used at the time of the input of the personal identification number is set to be 8, 2, 0, and 6, the numerals selected in the order of the cursor portions v14*i*, v14*c*, v14*a*, and v14*g* selected by the user become the personal identification number to be input.

Figure 14:
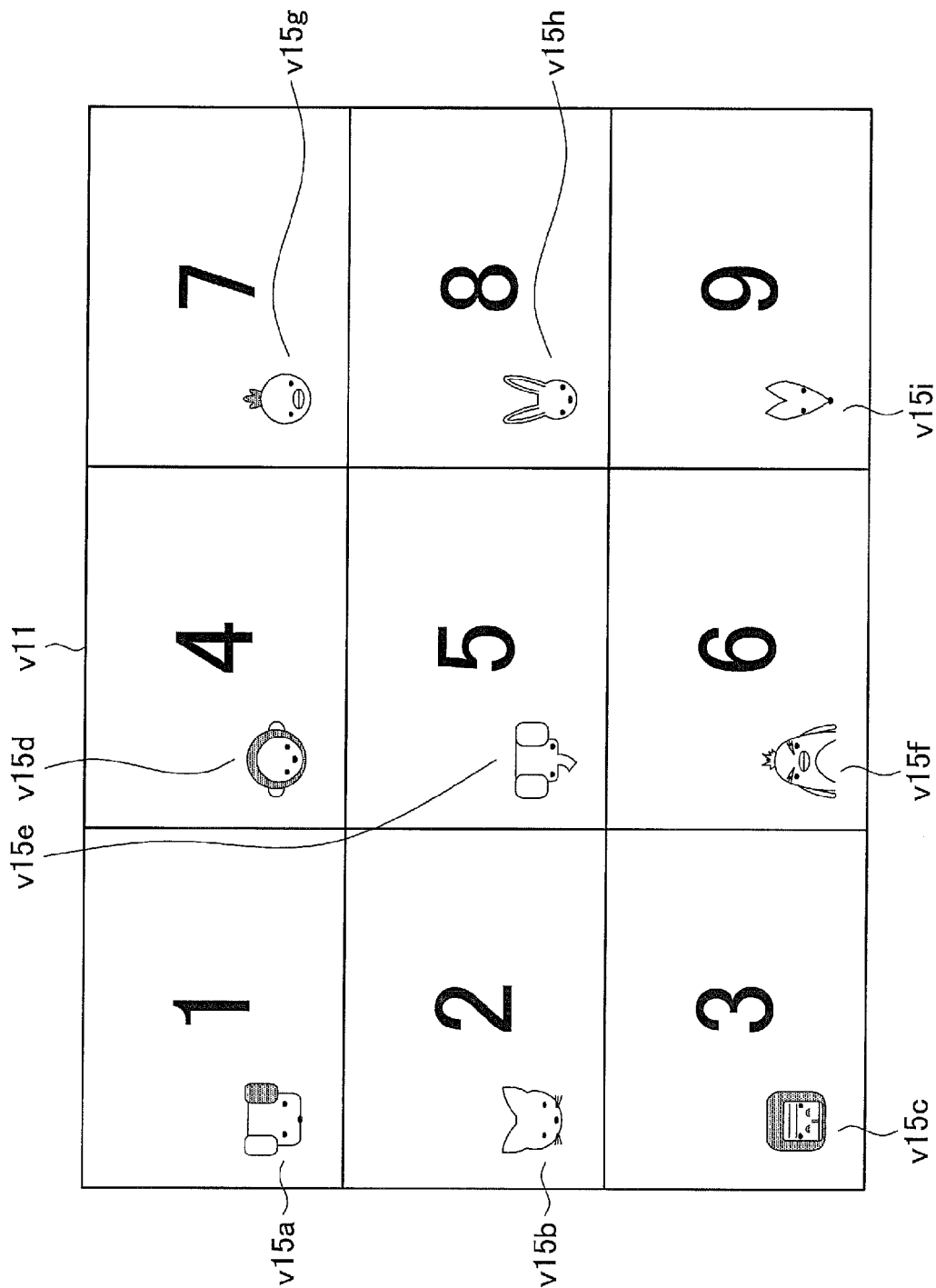
FIG. 14 is an explanatory diagram illustrating an example of a screen displayed on a display unit 110 by an information processing apparatus 100.

FIG. 14 is an explanatory diagram illustrating an example of a screen displayed on the display unit 110 by the information processing apparatus 100. In FIG. 14, a personal identification number display portion v11 and cursor portions v15*a* to v15*i* are illustrated. The cursor portions v15*a* to v15*i* are all icons of animal figures and have mutually different animals.

In the following description, it is assumed that the cursor portion v15*a* is a dog, the cursor portion v15*b* is a cat, the cursor portion v15*c* is a gorilla, the cursor portion v15*d* is a monkey, the cursor portion v15*e* is an elephant, the cursor portion v15*f* is a penguin, the cursor portion v15*g* is a chicken, the cursor portion v15*h* is a rabbit, and the cursor portion v15*i* is a fox. Of course, it is needless to say that the kinds or sequence of the animals are not limited to the related example. Also, the animals used as the cursor portions v15*a* to v15*i* may be real animals or may be imaginary animals.

The user attempting to log into the service using the information processing apparatus 100 displaying the cursor portions v15*a* to v15*i* illustrated in FIG. 14 memorizes the order of animals used at the time of the input of a personal identification number in advance and registers the memorized order of the animals in the server apparatus 10. For example, when the order of the animals used at the time of the input of the personal identification number is set to be the gorilla, the penguin, the cat, and the dog, numerals selected by the user in the order of the cursor portions v15*c*, v15*f*, v15*b*, and v15*a* become the personal identification number to be input. Also, although the example in which the icons of the animals are displayed as the cursor portions v15*a* to v15*i* by the display control unit 150 has been described in FIG. 14, mutually different symbols may be displayed as the cursor portions v15*a* to v15*i* by the display control unit 150.

When the information processing apparatus 100 causes the user to input a personal identification number, the information processing apparatus 100 can cause numerals to correspond to letters or the like displayed as the cursor portions v12*a* to v12*i* in a one-to-one manner. By causing the numerals to correspond to the letters or the like displayed as the cursor portions v12*a* to v12*i* in the one-to-one manner, the user can be caused to input a personal identification number through fewer selection operations than the actual number of digits at the time of the input of the personal identification number.

For example, the information processing apparatus 100 can cause letters A to I to correspond to numerals 1 to 9 respectively when the information processing apparatus 100 causes the user to input a personal identification number. Further, when the information processing apparatus 100 causes the user to input a personal identification number of 4 digits, the information processing apparatus 100 can operate such that the personal identification number is divided into 2 digits of the first half and 2 digits of the second half and the numerals of the 2 digits of the second half are input simultaneously with a selection operation of the 2 digits of the first half.

For example, a case in which the information processing apparatus 100 causes the user to input a personal identification number "3123" will be exemplified. The information processing apparatus 100 causes the user to input "31" and "23" of the personal identification number "3123" separately. As described above, when the letters A to I are caused to correspond to the numerals 1 to 9, "2" can be caused to correspond to "B" and "3" can be caused to correspond to "C."

Accordingly, when the information processing apparatus 100 causes the user to input the personal identification number "3123," the information processing apparatus 100 causes the user to perform a selection operation such as a mouse clicking operation of selecting the cursor portion v12*b* displayed as "B" in accordance with the area in which "3" of the personal identification number display portion v11 is displayed, and then causes the user to perform a selection operation such as a mouse clicking operation of selecting the cursor portion v12*c* displayed as "C" in accordance with the area in which "1" of the personal identification number display portion v11 is displayed. When such selection operations of the user are detected, the information processing apparatus 100 considers the personal identification number "3123" to be input by the user.

That is, when the personal identification number has 2N digits (where N≥1), the information processing apparatus 100 causes the user to input the personal identification number of 2N digits by causing the user to perform the selection operation N times.

Also, in the above-described example, the example in which the user is caused to input the numerals from the high-order digits to the low-order digits has been described, but embodiments of the present disclosure are not limited to the related example. For example, when the information processing apparatus 100 causes the user to input the personal identification number "3123," as described above, the information processing apparatus 100 may cause the user to input the 2 digits of the second half in order from "3" to "2."

That is, when the information processing apparatus 100 causes the user to input the personal identification number "3123," the information processing apparatus 100 causes the user to perform a selection operation such as a mouse clicking operation of selecting the cursor portion v12c displayed as "C" in accordance with the area in which "3" of the personal identification number display portion v11 is displayed, and then causes the user to perform a selection operation such as a mouse clicking operation of selecting the cursor portion v12b displayed as "B" in accordance with the area in which "1" of the personal identification number display portion v11 is displayed.

When the information processing apparatus 100 causes the user to input a personal identification number, the information processing apparatus 100 may use personal information such as hobbies or preferences registered in advance by the user.

The user of the information processing apparatus 100 registers information regarding his or her hobbies and preferences such as favorite foods, favorite sports, favorite colors, favorite celebrities, favorite places, favorite movies, and favorite music in the server apparatus 10 in advance. Then, when the user attempts to log into the service provided by the server apparatus 10, the server apparatus 10 transmits the information (user profile) regarding the hobbies and preferences registered in advance by the user to the information processing apparatus 100. The information processing apparatus 100 uses the received information (user profile) regarding the hobbies and preferences of the user when the user inputs the personal identification number.

Figure 15:
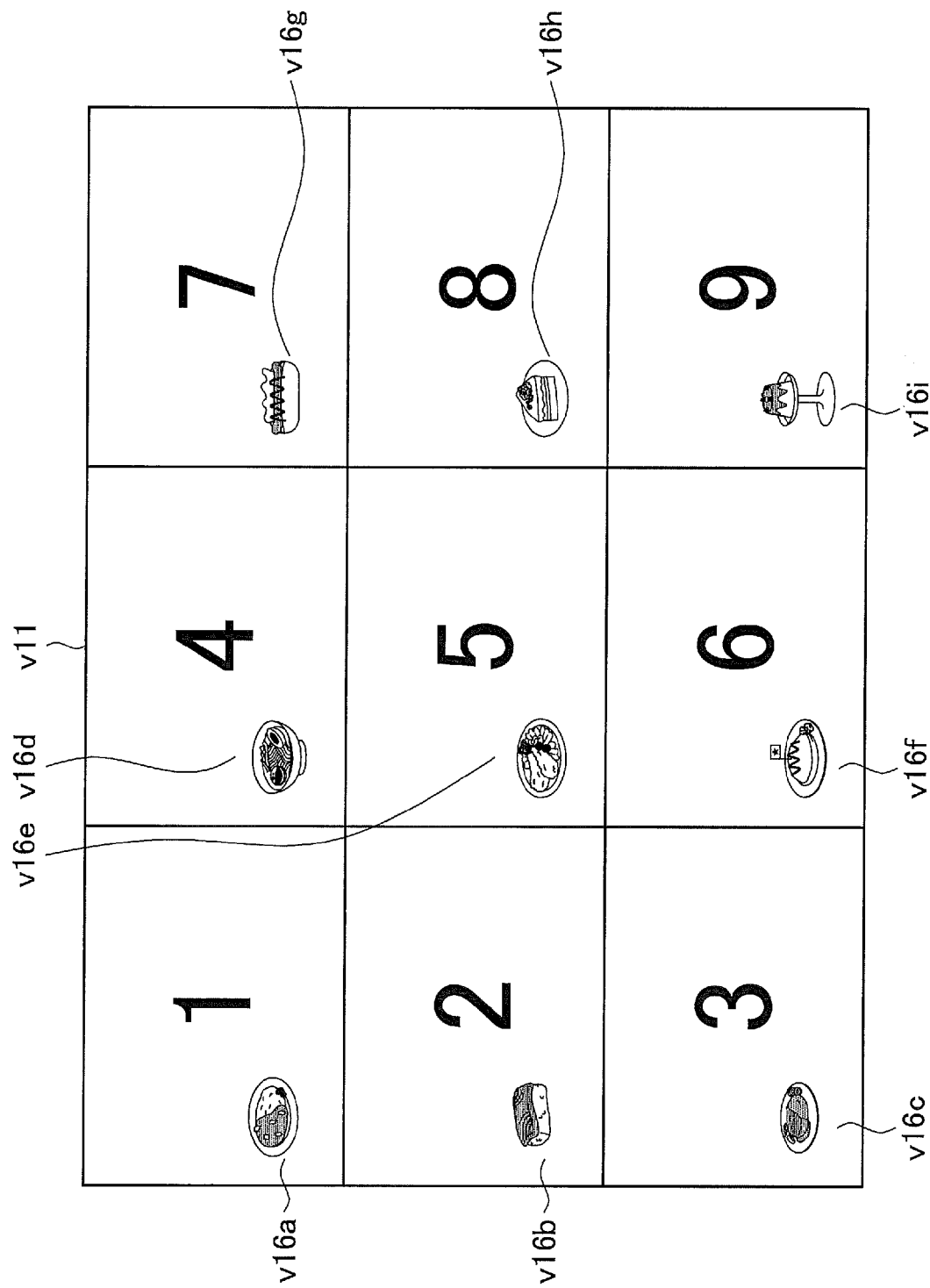
FIG. 15 is an explanatory diagram illustrating an example of a screen displayed on a display unit 110 by an information processing apparatus 100.

FIG. 15 is an explanatory diagram illustrating an example of a screen displayed on the display unit 110 by the information processing apparatus 100. In FIG. 15, a personal identification number display portion v11 and cursor portions v16a to v16i are illustrated. The cursor portions v16a to v16i are icons that all represent foods and represent mutually different types of food.

In the following description, it is assumed that the cursor portion v16a is curry rice, the cursor portion v16b is sushi, the cursor portion v16c is a Hamburg steak, the cursor portion v16d is ramen, the cursor portion v16e is fried shrimp, the cursor portion v16f is an omelet, the cursor portion v16g is a hotdog, the cursor portion v16h is a cake, and the cursor portion v16i is pudding. Of course, it is needless to say that the kinds or sequence of the animals are not limited to the related example.

For example, as illustrated in FIG. 15, when 9 pieces of food are displayed as the cursor portions v16a to v16i and the favorite food of the user is assumed to be ramen, the information processing apparatus 100 sets a numeral displayed at a position indicated by the cursor portion v16d displayed as the ramen icon as a numeral input by the user at a time point at which the user performs a mouse clicking operation. When the user performs the mouse clicking operation, the information processing apparatus 100 causes the display unit 110 to subsequently display an icon representing sports and causes the user to perform a similar selection operation. By repeating the display of the icons and the selection operation by the digits of the personal identification number, the information processing apparatus 100 can cause the user to input the personal identification number.

Also, when the information processing apparatus 100 causes the user to input the personal identification number, the information processing apparatus 100 can display face photos of a family including a user's face photo as icons. The user of the information processing apparatus 100 registers an order of family input as the personal identification number in the server apparatus 10 in advance. For example, when the user of the information processing apparatus 100 inputs a 4-digit personal identification number, the user registers an order in which his or her father, the user himself or herself, his or her son, and his or her mother are selected as a selection order in the server apparatus 10. When the user attempts to log into the service provided by the server apparatus 10, the server apparatus 10 transmits information regarding the selection order registered in advance by the user to the information processing apparatus 100. The information processing apparatus 100 uses the received information regarding the selection order of the user when the user inputs the personal identification number.

Figure 16:
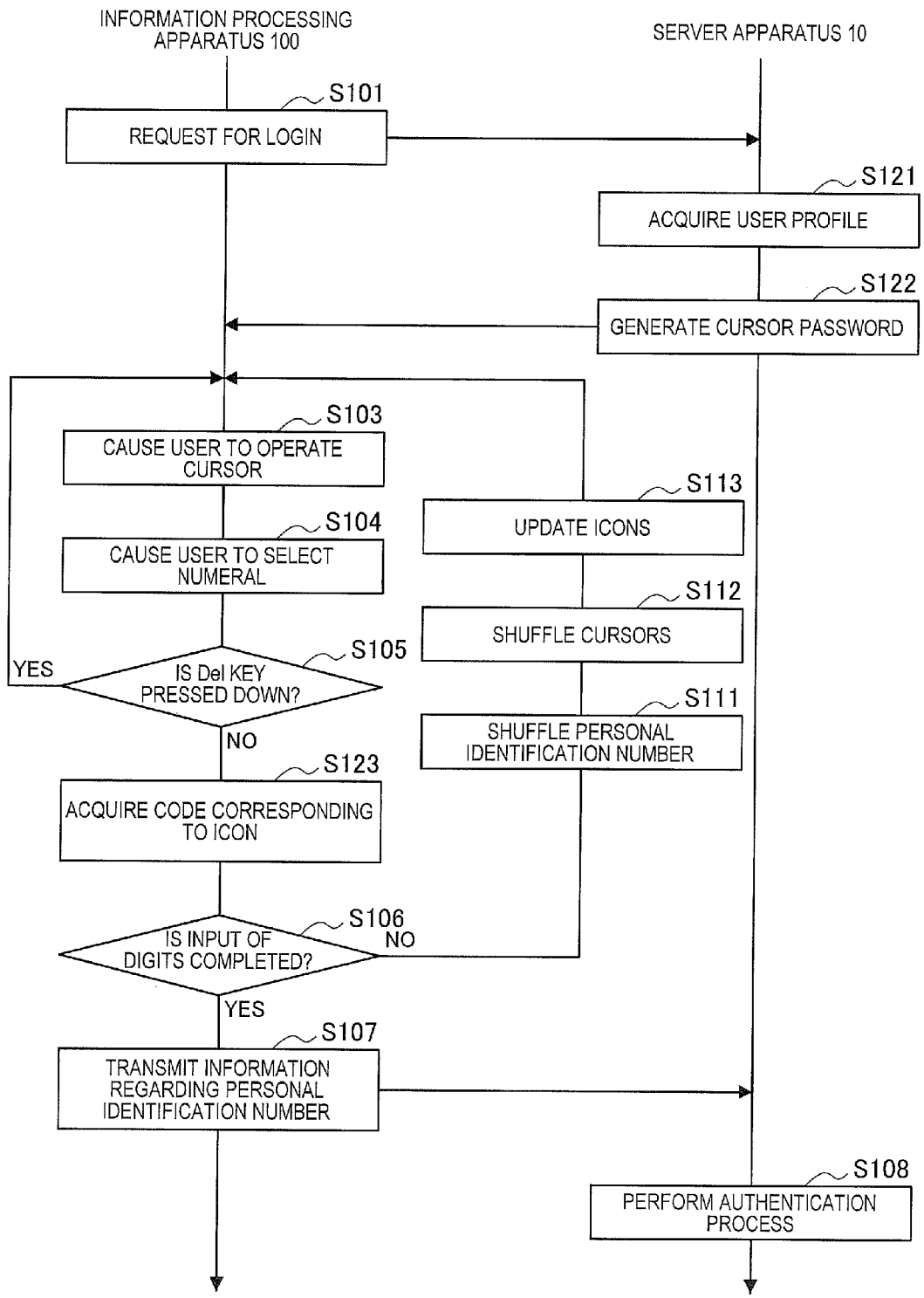
FIG. 16 is a flowchart illustrating an example of an operation of the information processing system 1 according to an embodiment of the present disclosure.

FIG. 16 is a flowchart illustrating an example of an operation of the information processing system 1 according to the embodiment of the present disclosure. The example illustrated in FIG. 16 is an example of an operation of the information processing system 1 when the user of the information processing apparatus 100 attempts to log into the service provided by the server apparatus 10. Hereinafter, the example of the operation of the information processing system 1 according to the embodiment of the present disclosure will be described with reference to FIG. 16.

First, the information processing apparatus 100 gives the server apparatus 10 a request for a user login to the service provided by the server apparatus 10 (step S101). The server apparatus 10 receiving the request for the user login from the information processing apparatus 100 acquires a user profile registered in advance and corresponding to the user (step S121). When the server apparatus 10 acquires the user profile, the server apparatus 10 generates a password (cursor password) corresponding to the user from the acquired user profile (step S122). The generation of this password will be described in detail later.

When the information processing apparatus 100 acquires the cursor password from the server apparatus 10, the information processing apparatus 100 generates the cursor portions and causes the display unit 110 to display the generated cursor portions along with the personal identification number display portion v11. Then, the information processing apparatus 100 causes the user to operate the generated cursor portions using the operation unit 120 (step S103) and causes the user to select one numeral among numerals displayed in the personal identification number display portion v11 through a selection operation (for example, a mouse clicking operation) using the operation unit 120 (step S104).

Subsequently, the information processing apparatus 100 determines whether the user performs an operation (for example, presses a Delete button of a keyboard) using the operation unit 120 to delete the selected numeral (step S105). When it is determined in step S105 that the operation is performed to delete the selected numeral, the information processing apparatus 100 returns the process to step S103 and causes the user to operate the cursor portions v12a to v12i using the operation unit 120.

Conversely, when it is determined in step S105 that the operation is not performed to delete the selected numeral, the information processing apparatus 100 subsequently acquires a code corresponding to an icon (step S123) and further determines whether an input of numerals of the personal identification number is completed (step S106).

When it is determined in step S106 that the input of the numerals of the personal identification number is not completed, the information processing apparatus 100 changes the sequence of the numerals displayed in the personal identification number display portion v11 at random (step S110) and further changes the sequence of the cursor portions at random (step S111) before return to step S103.

Further, the information processing apparatus 100 updates the icons displayed as the cursor portions based on the user profile (step S113).

Conversely, when it is determined in step S106 that the input of the numerals of the personal identification number is completed, the information processing apparatus 100 transmits information regarding the input personal identification number to the server apparatus 10 (step S107). The server apparatus 10 performs the user authentication process based on the personal identification number transmitted from the information processing apparatus 100 (step S108). The server apparatus 10 performs the user authentication process according to whether the personal identification number registered in advance is identical with the personal identification number transmitted from the information processing apparatus 100.

The information processing apparatus 100 according to the present embodiment can operate, as described above, so that the user can safely input the personal identification number based on the information regarding the user and the user's hobbies and preferences, which is information known only by the user.

The server apparatus 10 can generate the password used to input the personal identification number in a random order from the user profile registered in advance. That is, when the length of the personal identification number has k digits, the server apparatus 10 can generate k! passwords.

Also, in the above-described example, when the server apparatus 10 receives the request for the login from the information processing apparatus 100, the server apparatus 10 has acquired the user profile registered in advance and corresponding to the target user. However, the server apparatus 10 may acquire the user profile from another apparatus different from the server apparatus 10.

FIG. 17A is a flowchart illustrating an example of an operation of the information processing system 1 according to the embodiment of the present disclosure. The example illustrated in FIG. 17A is an example of an operation of the information processing system 1 when the user of the information processing apparatus 100 attempts to log into the service provided by the server apparatus 10. Hereinafter, the example of the operation of the information processing system 1 according to the embodiment of the present disclosure will be described with reference to FIG. 17A.

The flowchart illustrated in FIG. 17A is different from the flowchart illustrated in FIG. 16 in that the server apparatus 10 acquires the user profile from another apparatus when the server apparatus 10 receives a request for a login from the information processing apparatus 100 (step S131). When the server apparatus 10 acquires the user profile, the server apparatus 10 generates a password (cursor password) corresponding to the user from the acquired user profile (step S132). The generation of this password will be described in detail later. Thus, even when the user profile is acquired from another apparatus different from the server apparatus 10, the information processing apparatus 100 can acquire the user profile used to input the personal identification number from the server apparatus 10.

Figure 17B:
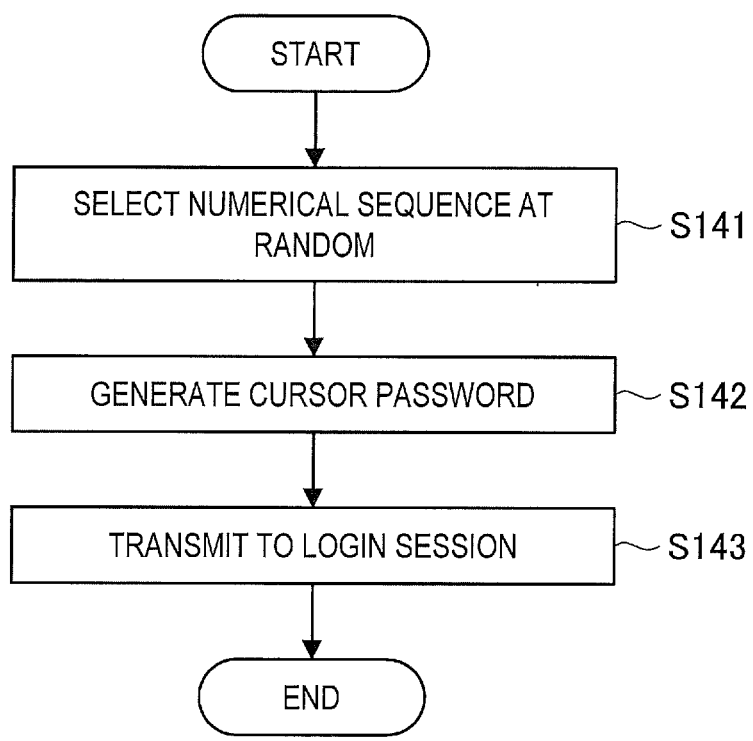
FIG. 17B is a flowchart illustrating an example of a process of generating a cursor password by a server apparatus 10.

Next, an example of a password (cursor password) generation process performed by the server apparatus 10 will be described. FIG. 17B is a flowchart illustrating an example of a cursor password generation process performed by the server apparatus 10 in the flowcharts illustrated in FIGS. 16 and 17A.

The server apparatus 10 selects a numerical sequence from a predetermined number of numerals at random (step S141). This predetermined numeral sequence is determined according to, for example, the number of types of questions for being generated as a cursor password. When the number of types of questions is 4, the server apparatus 10 selects a numerical sequence of 4 digits at random from 4 numerals 1, 2, 3, and 4 (for example, the server apparatus 10 selects a numeral sequence "3124"). Subsequently, the server apparatus 10 generates a cursor password using the numerals selected at random (step S142). Then, the server apparatus 10 transmits the generated cursor password to a login session (step S143).

The cursor password generation process in the server apparatus 10 will be described giving a specific example. For example, it is assumed that the types of questions are "Food," "City," "Music (Composer)," and "Animal." The numerals 1, 2, 3, and 4 can be respectively allocated to the types of questions. Also, it is assumed that choices of each question are as follows. The numerals 0, 1, . . . , and 9 are allocated to the respective choices in order from the left side.

Food: {"Curry," "Pasta," "Hamburger," "Pizza," "Sushi," "Tempura," "Ramen," "Fish," "Udon," and "Soba"}, City: {"London," "Paris," "Berlin," "Madrid," "Rome," "New York," "Tokyo," "Singapore," "Copenhagen," and "Mexico City"}, Music (Composer): {"Beethoven," "Vivaldi," "Mozart," "Bach," "Chopin," "Ravel," "Brahms," "Handel," "Tchaikovsky," and "Grieg"}, and Animal: {"Lion," "Elephant," "Flamingo," "Crocodile," "Kangaroo," "Panda," "Bison," "Bear," "Penguin," and "Zebra"}.

For example, when favorites of the user are assumed to be "Fish," "Madrid," "Ravel," and "Flamingo," numerals "7," "3," "5," and "2" are chosen among the foregoing choices.

Further, the server apparatus 10 selects the numerical sequence corresponding to the four types of questions at random. For example, the server apparatus 10 is assumed to select the numerical sequence "3241." This selection corresponds to a case in which the order of the types of questions is the order of "Music," "City," "Animal," and "Food." The server apparatus 10 can decide "5327" as the cursor password by selecting such a numerical sequence at random in this way.

Of course, the user knows that his or her favorite "Music" is "Ravel," his or her favorite "City" is "Madrid," his or her favorite "Animal" is "Flamingo," and his or her favorite of "Food" is "Fish." Accordingly, when the user inputs the digits of the personal identification number, the user can select his or her favorites from the food, the cities, the music (composer), and the animals displayed as the cursors in accordance with the cursors. Then, the server apparatus 10 can authenticate the user based on the personal identification number input by the user and the cursor password decided as described above.

When the server apparatus 10 selects numerals at random in this way, the server apparatus 10 can generate a cursor password that can be used only at that time, as in a so-called one-time password.

The information processing apparatus 100 can cause the user to input the personal identification number described above using a touch panel. When the information processing apparatus 100 causes the user to input the personal identification number using a touch panel, the information processing apparatus 100 can cause the display unit 110 to display buttons corresponding to a mouse clicking operation.

Figure 18:
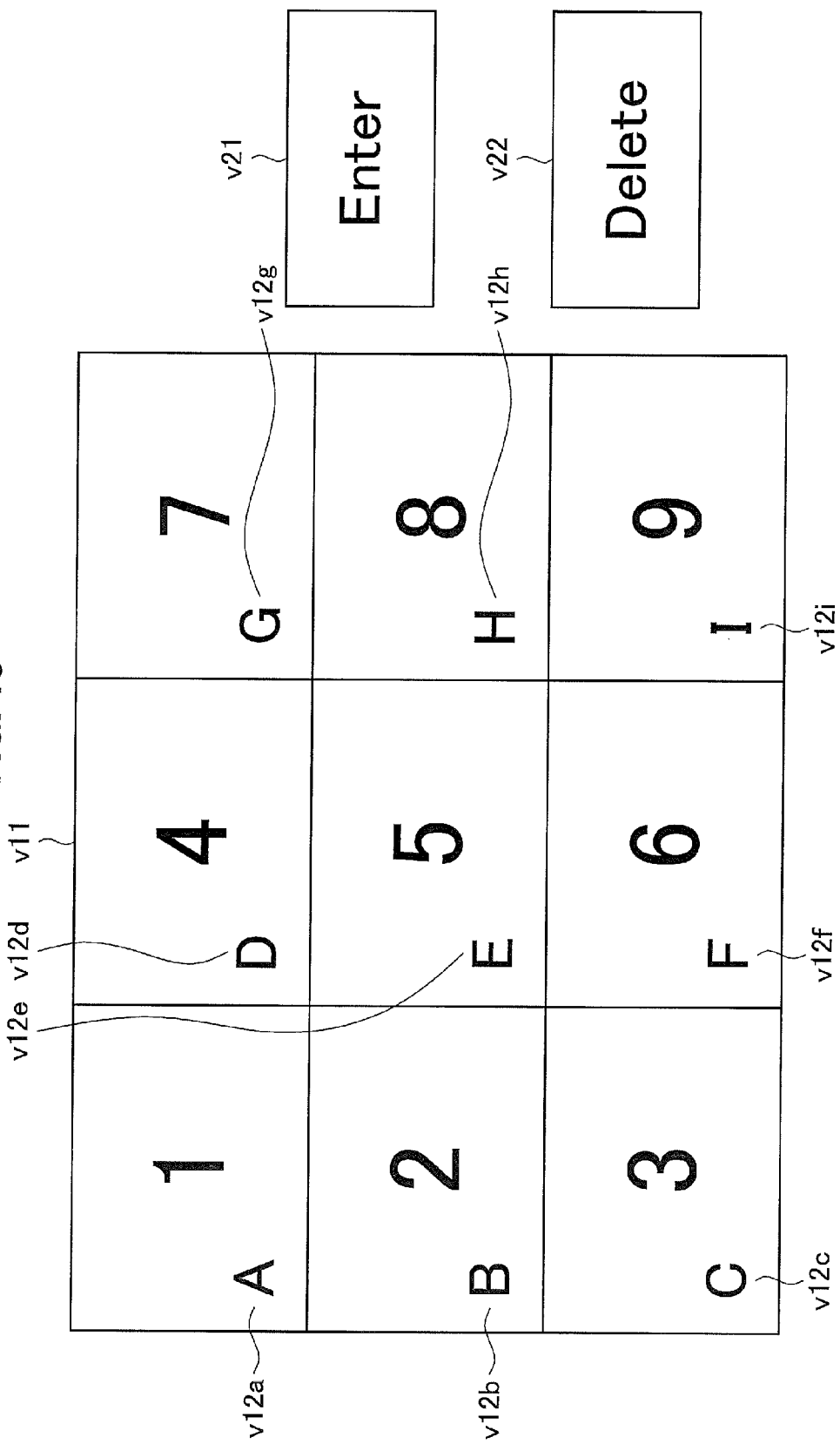
FIG. 18 is an explanatory diagram illustrating an example of a screen displayed on the display unit 110 by the information processing apparatus 100.

FIG. 18 is an explanatory diagram illustrating an example of a screen displayed on the display unit 110 by the information processing apparatus 100. FIG. 18 illustrates a state in which the personal identification number display portion v11, the cursor portions v12a to v12i, an input button v21, and a deletion button v22 are displayed.

When the information processing apparatus 100 is a smartphone, a portable music player, a portable game device, or the like and a touch panel is installed in the display unit 110, the information processing apparatus 100 can cause the user to operate the information processing apparatus 100 by causing the user to touch the display unit with his or her finger. In this case, the information processing apparatus 100 can cause the user to operate the cursor portions v12a to v12i by causing the user to operate the touch panel with his or her finger. Also, in this case, the information processing apparatus 100 can cause the user to input a personal identification number by causing the user to tap the input button v21. Also, the information processing apparatus 100 can cause the cause the user to delete the input personal identification number by causing the user to tap the deletion button v22.

Thus, when the information processing apparatus 100 causes the user to input the personal identification number using the touch panel, the information processing apparatus 100 can restrict a display size of the personal identification number display portion v11. That is, since the buttons which the user is caused to tap with his or her finger are the input button v21 and the deletion button v22, the sizes of the input button v21 and the deletion button v22 can be adjusted to sizes which are easy to operate with the finger, and it is not necessary to allocate a large area to the display of the personal identification number display portion v11.

In the examples described above, colors or forms of the cursor portions have not been changed through a movement operation by the user of the information processing apparatus 100. However, the information processing apparatus 100 may change and display the colors or forms of the cursor portions through a movement operation by the user of the information processing apparatus 100.

Figure 19:
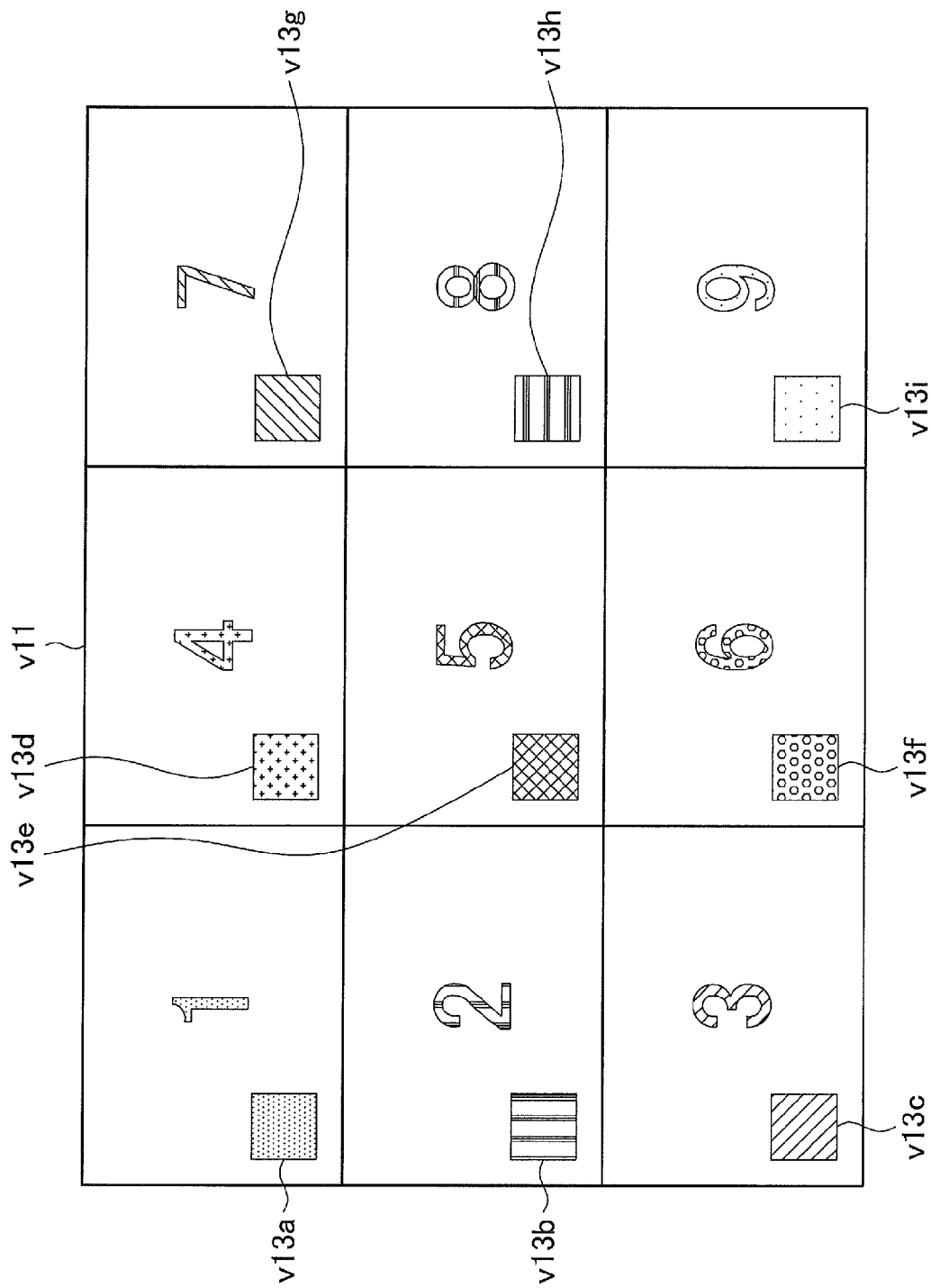
FIG. 19 is an explanatory diagram illustrating an example of a screen displayed on the display unit 110 by the information processing apparatus 100.

FIG. 19 is an explanatory diagram illustrating an example of a screen displayed on the display unit 110 by the information processing apparatus 100. In FIG. 19, a personal identification number display portion v11 and cursor portions v13a to v13i are illustrated. The cursor portions v13a to v13i are assumed to all be squares and mutually different colors (in FIG. 19, mutually different patterns of the cursor portions v13a to v13i are illustrated for convenience).

The example illustrated in FIG. 19 is different from the example illustrated in FIG. 13 in that the information processing apparatus 100 changes display colors of numerals displayed in the personal identification number display portion v11 in response to a movement operation of the cursor portions v13a to v13i by the user (in FIG. 19, mutually different patterns of the numerals displayed in the personal identification number display portion v11 are illustrated for convenience). Also, in the example illustrated in FIG. 19, colors are allocated to the numerals of digits of a personal identification number input by the user so that legitimacy of the input personal identification number is determined.

For example, a case in which the personal identification number is "3141" and the user allocates blue, red, green, and yellow to the first digit "3," the second digit "1," the third digit "4," and the fourth digit "1," respectively, and registers the colors and the digits in the server apparatus 10 will be described. In this case, when the user of the information processing apparatus 100 performs a selection operation of the cursor portion v13a displayed in blue in accordance with "3," subsequently performs a selection operation of the cursor portion v13e displayed in red in accordance with "1," subsequently perform a selection operation of the cursor portion v13f displayed in green in accordance with "4," and finally performs a selection operation of the cursor portion v13d displayed in yellow in accordance with "1," it is determined that the numerals selected by the user are legitimate numerals.

By allocating the colors to the numerals of the digits of the personal identification number input by the user and causing the colors to correspond to the numerals so that the user can select the numerals corresponding to the colors, the information processing system 1 according to the present embodiment can assist the user in memorizing the personal identification number and the password associated with the personal identification number more simply.

In the example illustrated in FIG. 19, the case in which the cursor portions v13a to v13i are square and the display colors are mutually different has been described, but embodiments of the present disclosure are not limited to the related example. For example, the information processing apparatus 100 may display different textures in the cursor portions and may change the textures of the numerals displayed in the personal identification number display portion v11 in response to a movement operation of the cursor portions by the user.

In the examples described above, the information processing apparatus 100 has displayed the cursor portions only in a display range of the personal identification number display portion v11, but embodiments of the present disclosure are not limited to the related example. For example, the cursor portions may be displayed on the entire screen.

Figure 20:
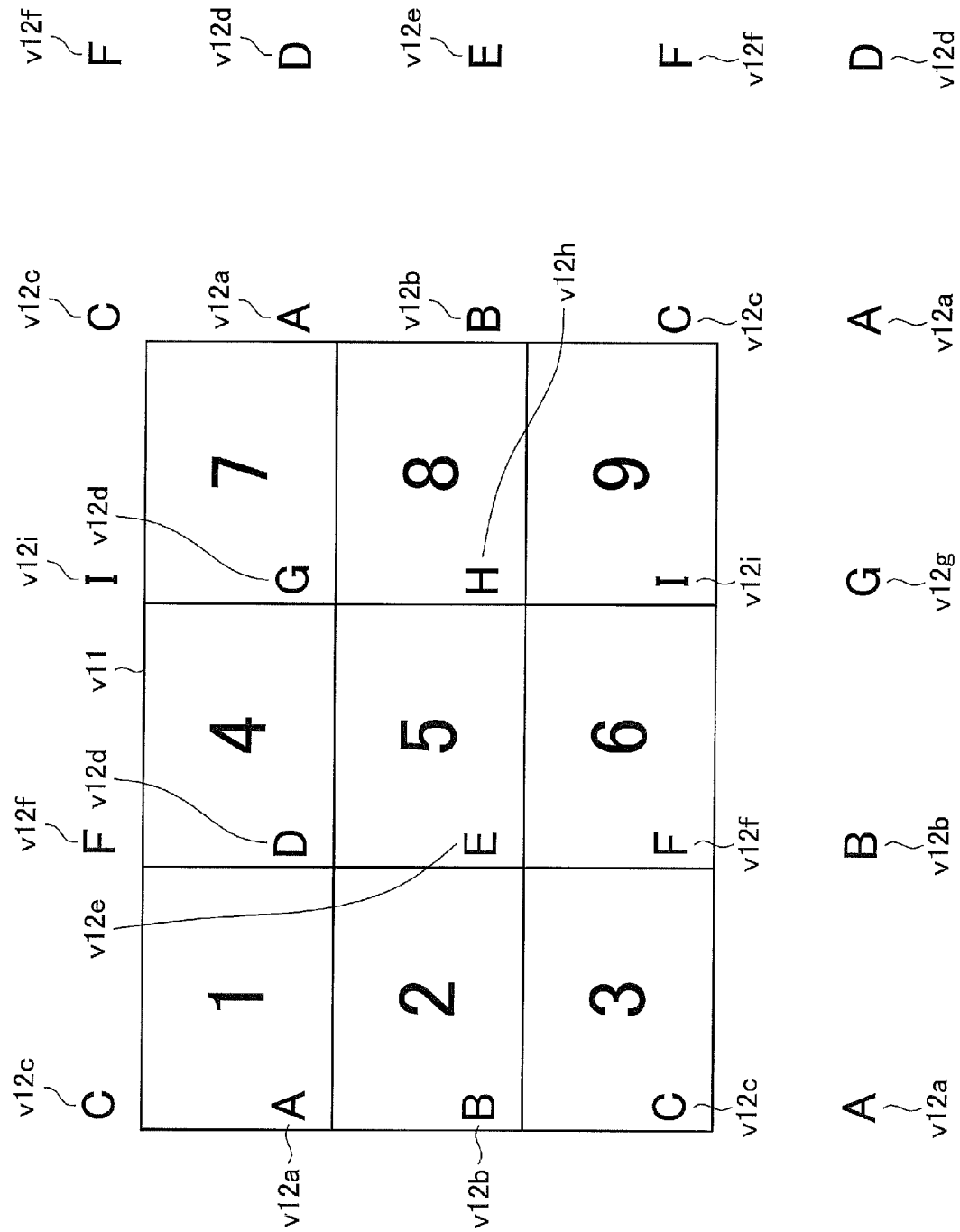
FIG. 20 is an explanatory diagram illustrating an example of a screen displayed on the display unit 110 by the information processing apparatus 100.
Figure 21:
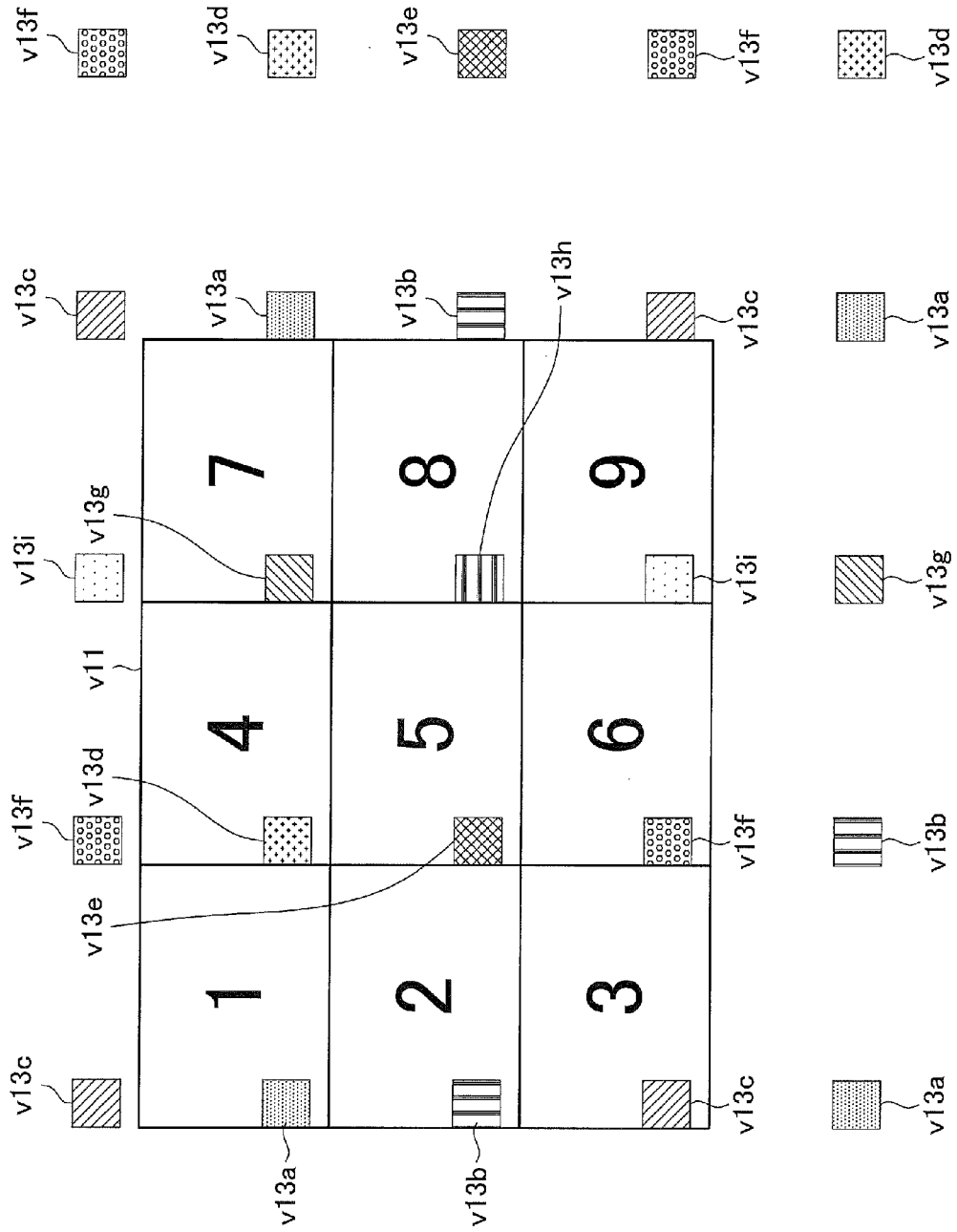
FIG. 21 is an explanatory diagram illustrating an example of a screen displayed on the display unit 110 by the information processing apparatus 100.

FIGS. 20 and 21 are explanatory diagrams illustrating examples of screens displayed on the display unit 110 by the information processing apparatus 100. The examples illustrated in FIGS. 20 and 21 are examples of the screens displayed on the display unit 110 by the information processing apparatus 100 when the cursor portions are displayed on the entire display unit 110. By displaying the cursor portions on the entire display unit 110 in this way, the information processing apparatus 100 can make it more difficult for the personal identification number of the user to be surreptitiously leaked to others.

In the above description, the personal identification number display portion v11 has been displayed in vertical 3 columns and horizontal 3 rows, but embodiments of the present disclosure are not limited to the related example. For example, to enable numerals 0 to 9 to be input, the personal identification number display portion may be displayed, for example, in 5 vertical columns and 2 horizontal TOWS.

Figure 22:
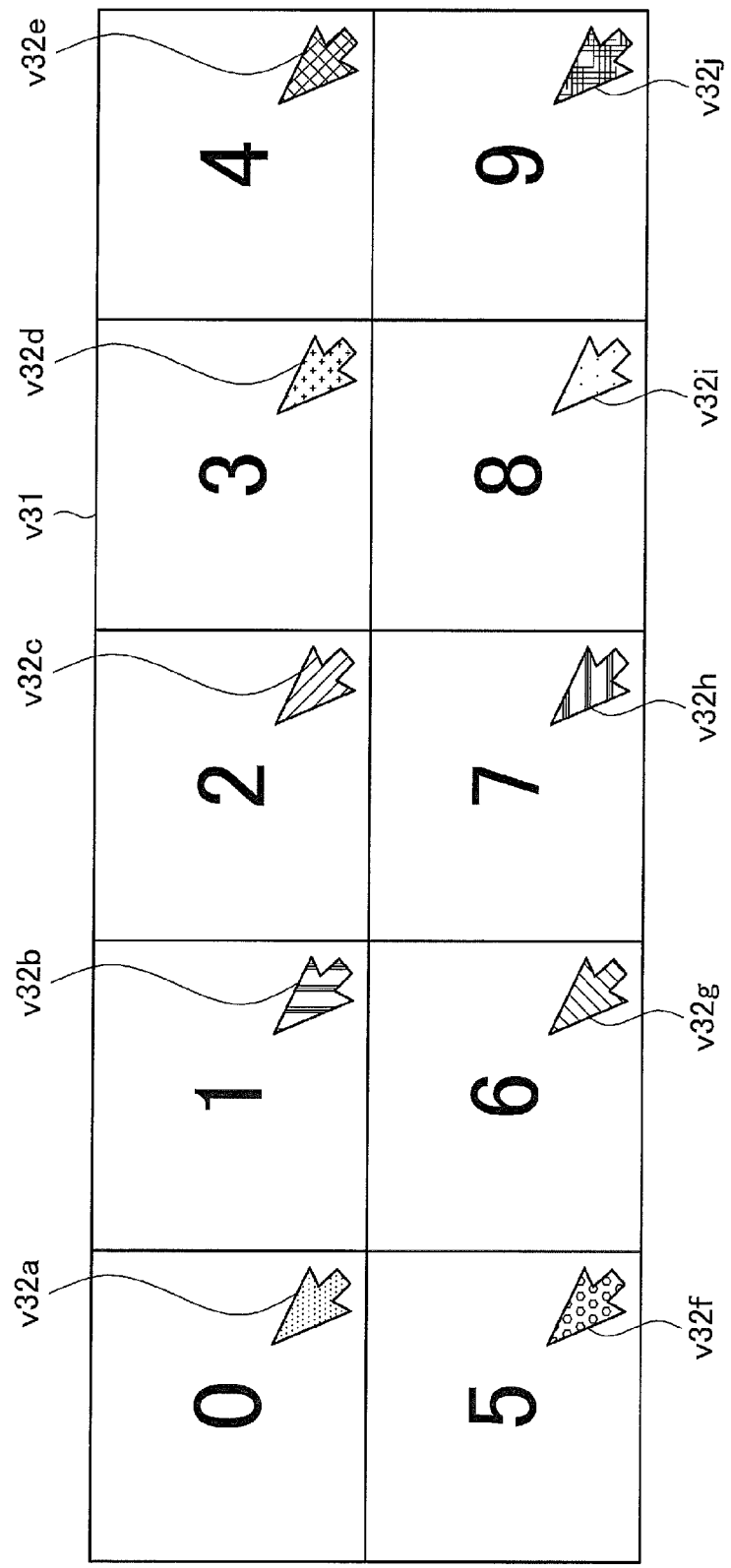
FIG. 22 is an explanatory diagram illustrating an example of a screen displayed on the display unit 110 by the information processing apparatus 100.

FIG. 22 is an explanatory diagram illustrating an example of a screen displayed on the display unit 110 by the information processing apparatus 100. In FIG. 22, a personal identification number display portion v31 and cursor portions v32a to v32j are illustrated. The cursor portions v32a to v32j are all arrow shapes and have mutually different colors (in FIG. 22, mutually different patterns of the cursor portions v32a to v32j are illustrated for convenience).

By displaying the personal identification number display portion v31 and the cursor portions v32a to v32j in this way, the information processing apparatus 100 enables the user to input the numerals 0 to 9 when the information processing apparatus 100 causes the user to input the personal identification number.

Figure 23:
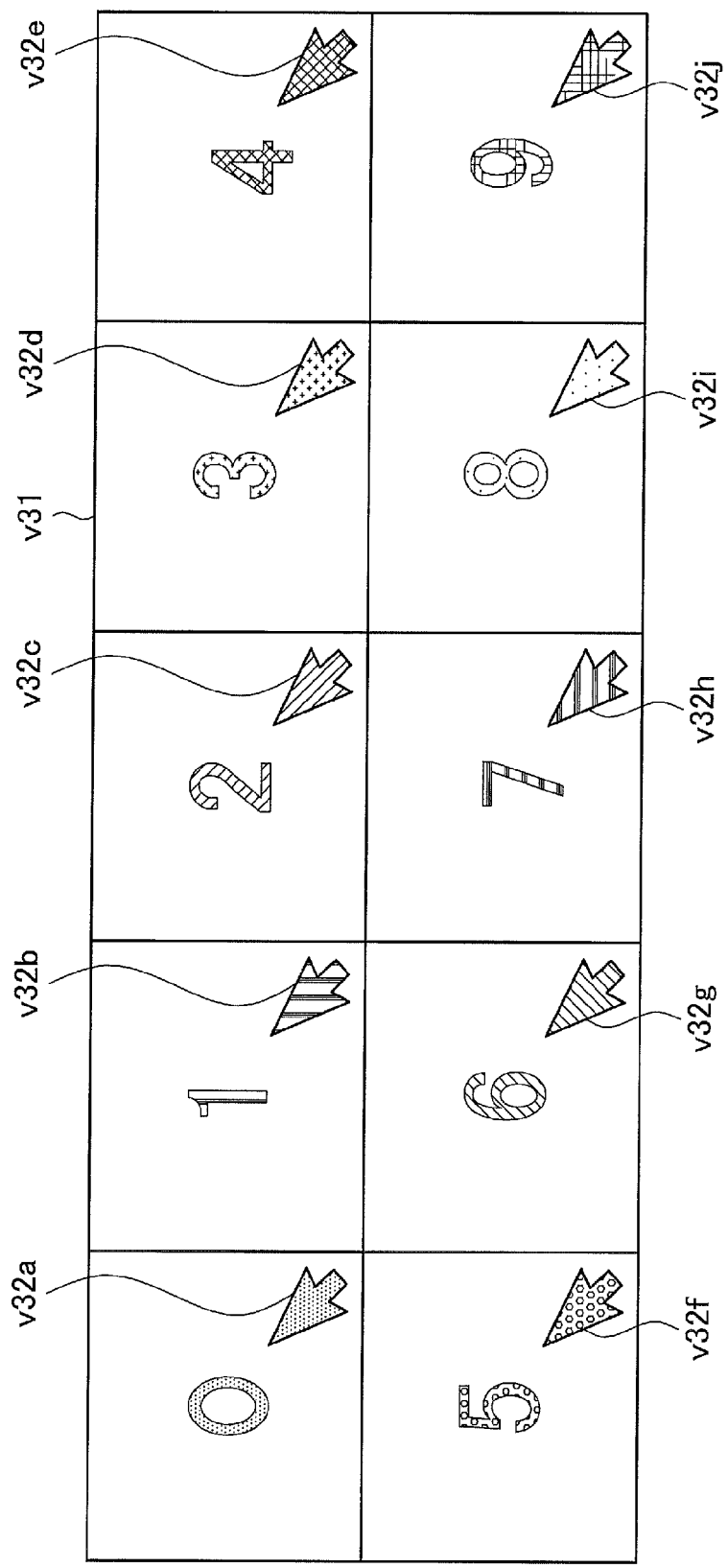
FIG. 23 is an explanatory diagram illustrating an example of a screen displayed on the display unit 110 by the information processing apparatus 100.

FIG. 23 is an explanatory diagram illustrating an example of a screen displayed on the display unit 110 by the information processing apparatus 100. In FIG. 23, a personal identification number display portion v31 and cursor portions v32a to v32j are illustrated. The cursor portions v32a to v32j are all arrow shapes and have mutually different colors (in FIG. 23, mutually different patterns of the cursor portions v32a to v32j are illustrated for convenience).

The example illustrated in FIG. 23 is a display example in which the colors of the numerals displayed in the personal identification number display portion v31 are changed in response to movement operations of the cursor portions v32a to v32j by the user, as in the display example illustrated in FIG. 19 (in FIG. 23, mutually different patterns of the numerals displayed in the personal identification number display portion v31 are illustrated for convenience).

Figure 24:
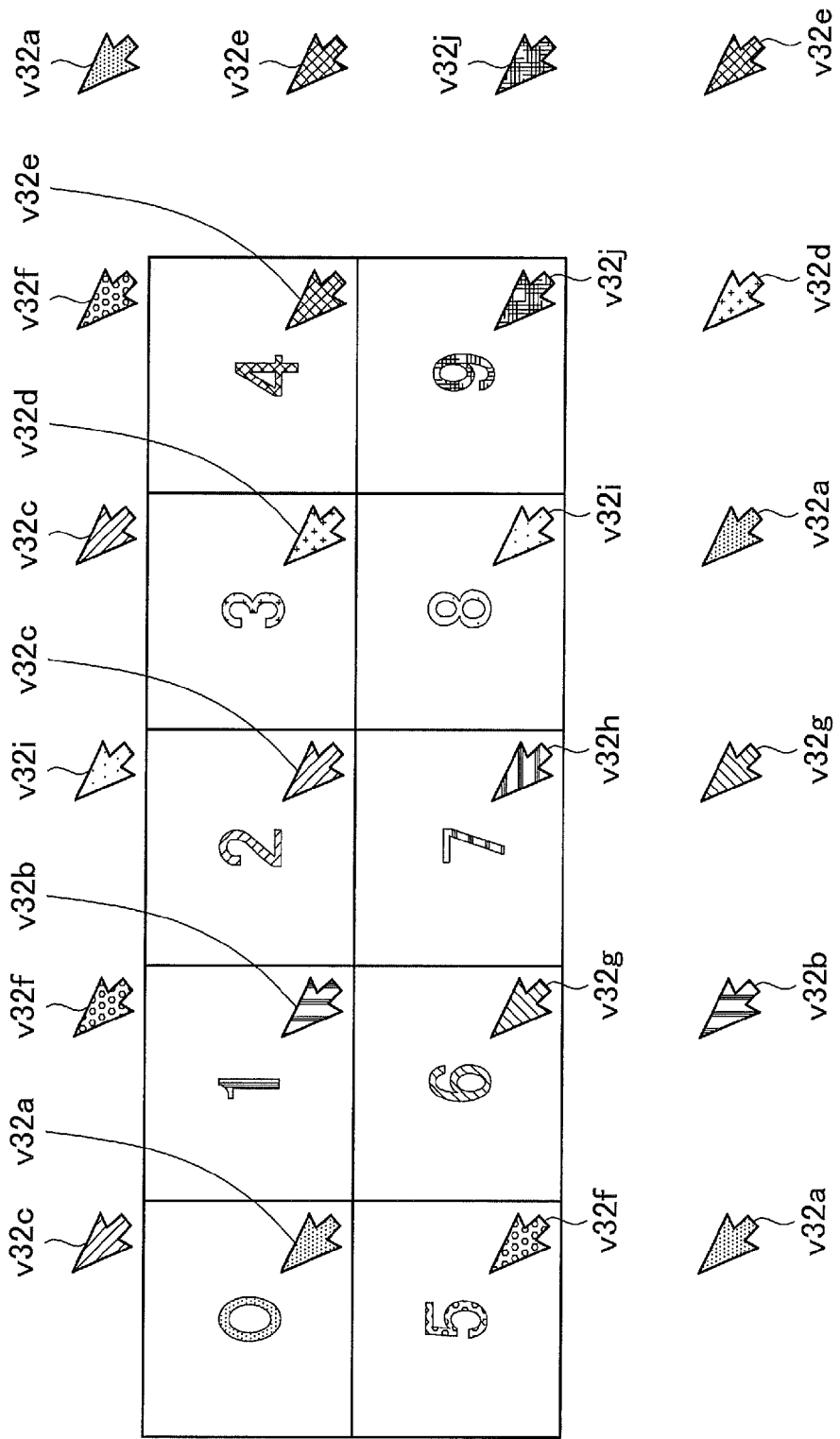
FIG. 24 is an explanatory diagram illustrating an example of a screen displayed on the display unit 110 by the information processing apparatus 100.

FIG. 24 is an explanatory diagram illustrating an example of a screen displayed on the display unit 110 by the information processing apparatus 100. In FIG. 24, a personal identification number display portion v31 and cursor portions v32a to v32j are illustrated. The cursor portions v32a to v32j are all arrow shapes and have mutually different colors. Also, the example illustrated in FIG. 24 is a display example in which the cursor portions v32a to v32j are displayed on the entire screen, as in the examples illustrated in FIGS. 20 and 21. By displaying the cursor portions on the entire display unit 110 in this way, the information processing apparatus 100 can make it more difficult for the personal identification number of the user to be surreptitiously leaked to others.

In the examples described above, the displays positions of the cursor portions have not particularly been controlled when the personal identification number is input or the personal identification number is selected. However, the information processing apparatus 100 according to the present embodiment may perform display control such that positions serving as references used to display the cursor portions are changed at random when the personal identification number is input or the personal identification number is selected.

Figure 25:
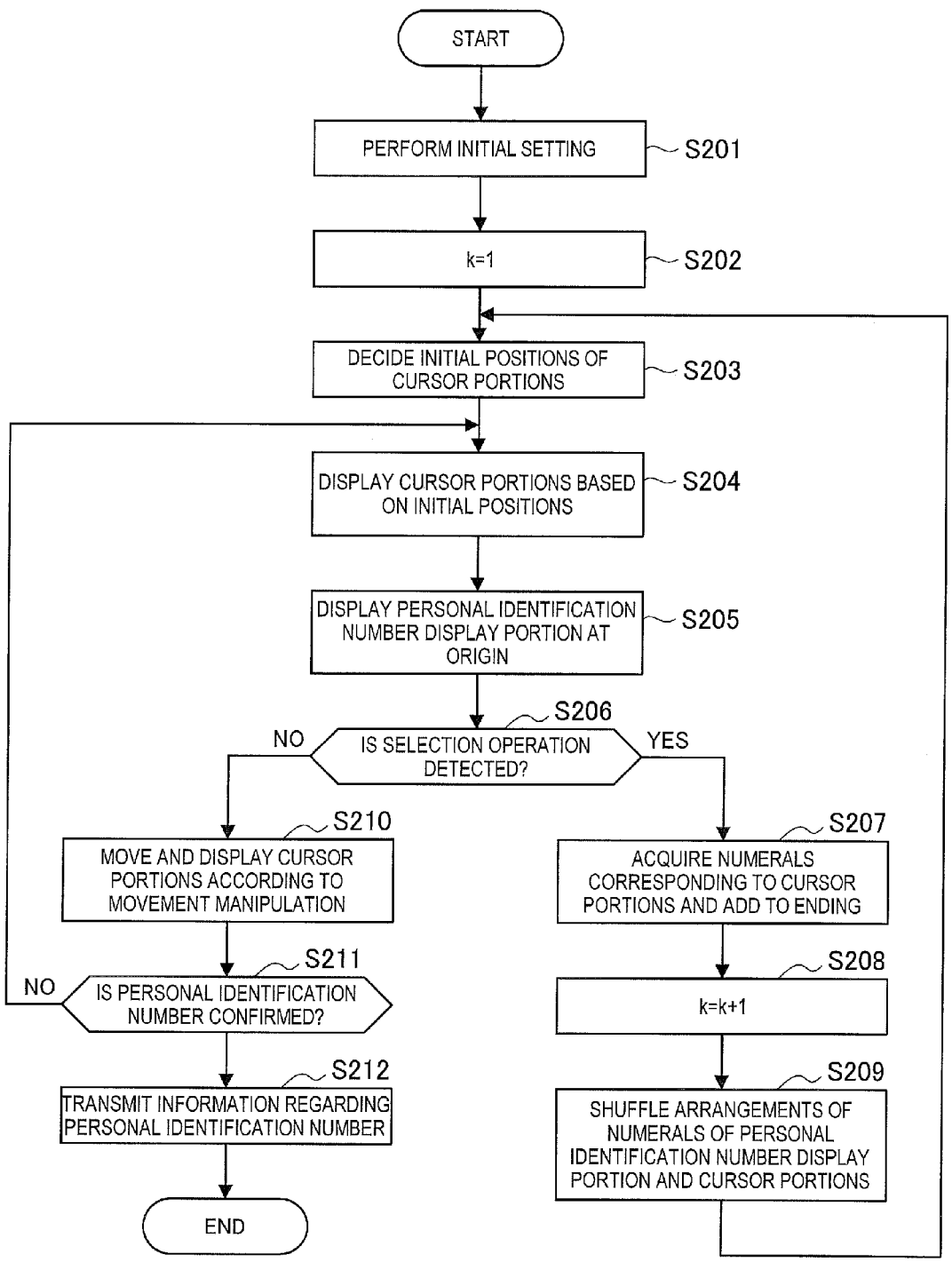
FIG. 25 is a flowchart illustrating an example of an operation of the information processing system 1 according to an embodiment of the present disclosure.
Figure 26:
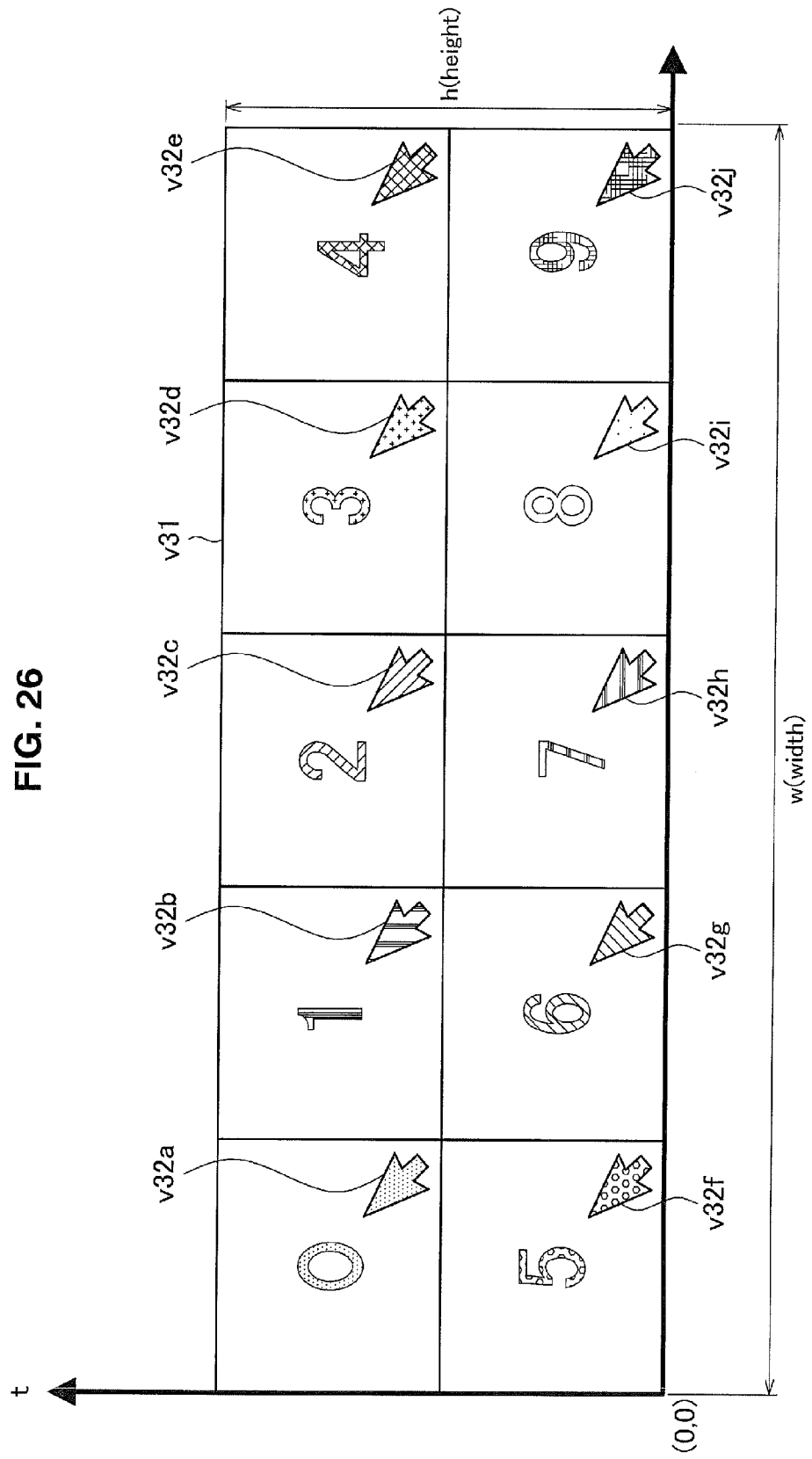
FIG. 26 is an explanatory diagram for describing the example of the operation of the information processing system 1 according to the flowchart of FIG. 25.

FIG. 25 is a flowchart illustrating an example of an operation of the information processing system 1 according to the embodiment of the present disclosure. The flowchart illustrated in FIG. 25 is an example of an operation of the information processing system 1 when the user of the information processing apparatus 100 attempts to log into the service provided by the server apparatus 10. Hereinafter, the example of the operation of the information processing system 1 according to the embodiment of the present disclosure will be described with reference to FIG. 25. Also, FIG. 26 is an explanatory diagram for describing the example of the operation of the information processing system 1 according to the flowchart illustrated in FIG. 25. In FIG. 26, a personal identification number display portion v31 and cursor portions v32a to v32j are illustrated as an example. Also, FIG. 26 illustrates a coordinate system in which the lower left of the personal identification number display portion v31 is set as the origin (0, 0) and positive values are set in the left and upward directions.

When the information processing apparatus 100 gives the server apparatus 10 a request for a user login to the service provided by the server apparatus 10 by an input or the like of a user ID on a login page, the server apparatus 10 performs initial setting by acquiring a password corresponding to the user (or acquiring a pair of a personal identification number and a password) (step S201).

When the initial setting is performed by the server apparatus 10 and information regarding the password used to input the personal identification number is transmitted from the server apparatus 10 to the information processing apparatus 100, the information processing apparatus 100 initial-izes a variable k representing the number of input digits of the personal identification number to 1 (step S202). This initialization can be performed by the information acquisition unit 140.

When the variable k is initialized to 1 in the foregoing step S202, the information processing apparatus 100 subsequently decides initial positions of the cursor portions (step S203). As the initial position of each cursor portion, one point is selected at random in a display area of the personal identification number display portion. That is, as illustrated in FIG. 26, the width and the height of the personal identification number display portion v31 are assumed to be w and h, respectively, and one point between 0 and w and between 0 and h is decided as the initial position of the cursor portion at random.

When the initial position of the cursor portion is decided, the information processing apparatus 100 subsequently displays the cursor portion based on the initial position decided in step S203 (step S204). For example, when $(o_x, o_y)$ in FIG. 26 is set as the initial position, a position obtained by adding $(o_x, o_y)$ to a position $(pos_x, pos_y)$ of a mouse cursor (not shown on the display unit 110) at the time of the decision of the initial position becomes the position of the mouse cursor and the cursor portions v32a to v32j are displayed based on the position of the mouse cursor.

The cursor portions are displayed in the foregoing step S204 and the information processing apparatus 100 displays the personal identification number display portion v31 on the display unit 110 so that the position of the origin is located at the lower left (step S205). The cursor portions displayed on the display unit 110 are moved on the screen under the control of the display control unit 150 based on a movement operation (a mouse movement operation, a movement operation of a finger on a touch panel, or the like) from the user.

Subsequently, the information processing apparatus 100 determines whether the selection operation such as a mouse clicking operation by the user is detected (step S206). When the selection operation is detected in step S206, the information processing apparatus 100 acquires the numerals displayed in the personal identification number display portion v31 at the positions corresponding to the cursor portions at the time of the detection and adds the numerals to the ending of the variable for retaining the numerals as the personal identification number (step S207).

When the numerals displayed in the personal identification number display portion v31 are acquired at the positions corresponding to the cursor portions at the time of the detection in step S207, the information processing apparatus 100 subsequently increases the value of the variable k by one (step S208) and shuffles the arrangement of the numerals displayed in the personal identification number display portion v31 and the arrangement of the cursor portions v32a to v32j, as necessary (step S209).

When the value of the variable k is increased by one and the arrangement of the numerals displayed in the personal identification number display portion v31 and the arrangement of the cursor portions v32a to v32j are shuffled, as necessary, the information processing apparatus 100 returns the process to the foregoing step S203. That is, one point in the display area of the personal identification number display portion is selected as the initial position again.

Conversely, when the selection operation is not detected in step S206, the information processing apparatus 100 moves the cursor portions on the screen under the control of the display control unit 150 based on a movement operation (a mouse movement operation, a movement operation of a finger on a touch panel, or the like) from the user (step S210). Then, the information processing apparatus 100 determines whether an operation of confirming the personal identification number is performed (step S211). As the operation performed to confirm the personal identification number, for example, an input operation performed by the designated number of digits of the personal identification number may be performed or the selection operation of the input button v21 illustrated in FIG. 18 may be performed.

When the operation of confirming the personal identification number is performed, the information processing apparatus 100 returns the process to step S204 and continuously displays the cursor portions using the initial positions. Conversely, when the operation of confirming the personal identification number is performed, the information processing apparatus 100 transmits the personal identification number input based on a user's operation to the server apparatus 10, and then the server apparatus 10 performs the user authentication process based on the personal identification number (step S212).

When the personal identification number is correct, the server apparatus 10 permits the user to use the service. However, when the personal identification number is wrong, the server apparatus 10 refuses to let the user use the service. The information processing apparatus 100 notified of the refusal of the use of the service can reset the variable k to 1 so that the user can input the personal identification number again.

Thus, by changing the position (initial position) serving as the reference used to display the cursor portion at random at the time of the input of the personal identification number or at the time of the selection of the personal identification number, it is possible to prevent the personal identification number input by the user from being leaked to others since the positions of the cursor portions v32*a* to v32*j* of which display positions are changed at random are not acquirable by malicious software for tracking the position of the mouse cursor even if such software is embedded in the information processing apparatus 100.

2. Conclusion

According to the embodiment of the present disclosure described above, there is provided the information processing apparatus 100 that displays the plurality of cursor portions all having the same motion on a screen and causes the user to select the numerals using the plurality of cursor portions when causing the user to input a personal identification number. The cursor portions used to select the numerals are decided based on information regarding the password or the user profile registered in advance by the user.

The information processing apparatus 100 according to the embodiment of the present disclosure can considerably reduce a surreptitious leakage risk of the personal identification number by causing the user to select the numerals using the plurality of cursor portions based on the information regarding the password or the user profile registered in advance by the user.

In the above-described examples, the password or the personal identification number is transmitted and received between the server apparatus 10 and the information processing apparatus 100, but embodiments of the present disclosure are not limited to the related example. It is needless to say that the above-described embodiment can be applied even when a pair of the personal identification number and the password is retained in the information processing apparatus 100 and the information processing apparatus 100 completes a process alone.

The steps of the process performed by each apparatus in the present specification may not necessarily be processed chronologically in the orders described in the sequence diagrams or the flowcharts. For example, the steps of the process performed by each apparatus may be processed in an order different from the order described in each flowchart or may be processed in parallel.

Also, a computer program for causing hardware such as a CPU, a ROM, and a RAM included in each apparatus to have the same functions of the above-described configuration of each apparatus can be generated. Also, a storage medium having the computer program stored therein can be provided. Also, a series of processes can be realized by hardware by configuring each functional block shown in the functional block diagram as hardware.

The preferred embodiments of the present disclosure have been described in detail above with reference to the appended drawings, but embodiments of the present disclosure are not limited to the examples. It should be understood by those skilled in the technical fields of the present disclosure that various modifications or corrections may be made within the technical spirit and essence described in the claims and are, of course, construed to pertain to the technical scope of the present disclosure.

Additionally, the present technology may also be configured as below:

(1) An information processing apparatus including:
an operation detection unit configured to detect an operation of a user;
a display control unit configured to move and display first information formed by a plurality of first components different from each other according to a movement operation of the user detected by the operation detection unit and to fix and display second information formed by a plurality of second components different from each other; and
an information acquisition unit configured to acquire, based on the selection operation, information regarding the second components displayed at positions corresponding to the first components based on a selection operation of the user detected by the operation detection unit,
wherein the information regarding the second components acquired by the information acquisition unit based on the selection operation performed at least once and information regarding the first components corresponding to the information regarding the second components are used to authenticate the user.

(2) The information processing apparatus according to (1), wherein the display control unit changes display positions of the plurality of first components at random based on the detection of the selection operation by the operation detection unit.

(3) The information processing apparatus according to (1) or (2), wherein the display control unit changes display positions of the plurality of second components at random based on the detection of the selection operation by the operation selection unit.

(4) The information processing apparatus according to any one of (1) to (3), wherein the display control unit decides coordinates serving as a display reference at random at a time of the display of the first information.

(5) The information processing apparatus according to any one of (1) to (4), wherein the display control unit displays the first components using mutually different letters and displays the second components using mutually different numerals.

(6) The information processing apparatus according to any one of (1) to (4), wherein the display control unit displays the first components and the second components using mutually different numerals.

(7) The information processing apparatus according to any one of (1) to (4), wherein the display control unit displays the first components using mutually different colors and displays the second components using mutually different numerals.

(8) The information processing apparatus according to (7), wherein the display control unit changes display colors of the second components to match the colors of the first components based on the detection of the movement operation by the operation detection unit.

(9) The information processing apparatus according to any one of (1) to (4), wherein the display control unit displays the first components using mutually different icons and displays the second components using mutually different numerals.

(10) The information processing apparatus according to any one of (1) to (4), wherein the display control unit displays the first components using mutually different signs and displays the second components using mutually different numerals.

(11) The information processing apparatus according to any one of (1) to (4), wherein the display control unit displays the first components using mutually different pieces of information regarding preferences of the user.

(12) The information processing apparatus according to any one of (1) to (11), wherein the display control unit displays the second components in a grid form and displays the first components repeatedly at a same intervals as intervals of the second components.

(13) The information processing apparatus according to any one of (1) to (12), wherein the information acquisition unit acquires the information regarding 2N of the second components through the selection operation performed N times (where N≥1).

(14) An information processing method including:
detecting an operation of a user;
moving and displaying first information formed by a plurality of first components different from each other according to a movement operation detected in the detecting step, and fixing and displaying second information formed by a plurality of second components different from each other; and
acquiring, based on the selection operation, information regarding the second components displayed at positions corresponding to the first components based on a selection operation detected in the detecting step,
wherein the information regarding the second components acquired in the acquiring step based on the selection operation performed at least once and information regarding the first components corresponding to the information regarding the second components are used to authenticate the user.

(15) A computer program causing a computer to execute:
detecting an operation of a user;
moving and displaying first information formed by a plurality of first components different from each other according to a movement operation detected in the detecting step, and fixing and displaying second information formed by a plurality of second components different from each other; and
acquiring, based on the selection operation, information regarding the second components displayed at positions corresponding to the first components based on a selection operation detected in the detecting step,
wherein the information regarding the second components acquired in the acquiring step based on the selection operation performed at least once and information regarding the first components corresponding to the information regarding the second components are used to authenticate the user.

What is claimed is:

1. An information processing apparatus, comprising:
an operation detection unit configured to detect an operation of a user;
a display control unit configured to vary, in a user authentication process, first information that includes a plurality of first components different from each other, subsequent to movement of at least two of the plurality of first components in the same user authentication process based on a movement operation of the user detected by the operation detection unit, and to fix and display second information that includes a plurality of second components different from each other; and
an information acquisition unit configured to acquire, based on a selection operation, information associated with the plurality of second components displayed at positions corresponding to the plurality of first components based on the selection operation of the user detected by the operation detection unit,
wherein the information associated with the plurality of second components acquired by the information acquisition unit based on the selection operation and information associated with the plurality of first components corresponding to the information associated with the plurality of second components are used to authenticate the user,
wherein the at least two of the plurality of first components are interlocked such that, based on the movement operation of the user, a first motion by a first component of the at least two of the plurality of first components is same as a second motion by a second component of the at least two of the plurality of first components,
wherein each of the plurality of first components corresponds to a cursor position and
wherein the selection operation is determined based on the first component of the at least two of the plurality of first components.

2. The information processing apparatus according to claim 1, wherein the display control unit is further configured to change display positions of the plurality of first components at random subsequent to the detection of the selection operation of the user authentication process.

3. The information processing apparatus according to claim 1, wherein the display control unit is further configured to change display positions of the plurality of second components at random subsequent to the detection of the selection operation of the user authentication process.

4. The information processing apparatus according to claim 1, wherein the display control unit is further configured to decide coordinates that serve as a display reference at random at a time of display of the first information.

5. The information processing apparatus according to claim 1, wherein the display control unit is further configured to display the plurality of first components based on mutually different letters and display the plurality of second components based on mutually different numerals.

6. The information processing apparatus according to claim 1, wherein the display control unit is further configured to display the plurality of first components and the plurality of second components based on mutually different numerals.

7. The information processing apparatus according to claim 1, wherein the display control unit is further configured to display the plurality of first components based on mutually different colors and display the plurality of second components based on mutually different numerals.

8. The information processing apparatus according to claim 7, wherein the display control unit is further configured to change display colors of the plurality of second components to match display colors of the plurality of first components based on the detection of the movement operation by the operation detection unit.

9. The information processing apparatus according to claim 1, wherein the display control unit is further configured to display the plurality of first components based on mutually different icons and display the plurality of second components based on mutually different numerals.

10. The information processing apparatus according to claim 1, wherein the display control unit is further configured to display the plurality of first components based on mutually different signs and display the plurality of second components based on mutually different numerals.

11. The information processing apparatus according to claim 1, wherein the display control unit is further configured to display the plurality of first components based on mutually different pieces of information associated with preferences of the user.

12. The information processing apparatus according to claim 1, wherein the display control unit is further configured to display the plurality of second components in a grid form and display the plurality of first components repeatedly at same intervals as intervals of the plurality of second components.

13. The information processing apparatus according to claim 1, wherein the information acquisition unit is further configured to acquire the information associated with 2N of the plurality of second components through the selection operation executed N times (where N≥1), wherein 2N is number of second components for which the information associated with the plurality of second components is acquired.

14. An information processing method, comprising:
    detecting an operation of a user;
    varying, in a user authentication process, first information that includes a plurality of first components different from each other, subsequent to movement of at least two of the plurality of first components in the same user authentication process based on a movement operation detected as the operation, and fixing and displaying second information that includes a plurality of second components different from each other; and
    acquiring, based on a selection operation, information regarding the plurality of second components displayed at positions corresponding to the plurality of first components based on the selection operation detected as the operation,
    wherein the acquired information regarding the plurality of second components based on the selection operation and information regarding the plurality of first components corresponding to the information regarding the plurality of second components are used to authenticate the user,
    wherein the at least two of the plurality of first components are interlocked such that, based on the movement operation of the user, a first motion by a first component of the at least two of the plurality of first components is same as a second motion by a second component of the at least two of the plurality of first components,
    wherein each of the plurality of first components corresponds to a cursor position and
    wherein the selection operation is determined based on the first component of the at least two of the plurality of first components.

15. A non-transitory computer-readable medium having stored therein computer-executable instructions which when executed by a computer causes the computer to execute operations, the operations comprising:
    detecting an operation of a user;
    varying, in a user authentication process, first information that includes a plurality of first components different from each other, subsequent to movement of at least two of the plurality of first components in the same user authentication process based on a movement operation detected as the operation, and fixing and displaying second information that includes a plurality of second components different from each other; and
    acquiring, based on a selection operation, information regarding the plurality of second components displayed at positions corresponding to the plurality of first components based on the selection operation detected as the operation,
    wherein the acquired information regarding the plurality of second components based on the selection operation and information regarding the plurality of first components corresponding to the information regarding the plurality of second components are used to authenticate the user,
    wherein the at least two of the plurality of first components are interlocked such that, based on the movement operation of the user, a first motion by a first component of the at least two of the plurality of first components is same as a second motion by a second component of the at least two of the plurality of first components,
    wherein each of the plurality of first components corresponds to a cursor position and
    wherein the selection operation is determined based on the first component of the at least two of the plurality of first components.

* * * * *